(12) United States Patent
Fukumoto

(10) Patent No.: US 11,029,743 B2
(45) Date of Patent: Jun. 8, 2021

(54) INFORMATION PROCESSING DEVICE AND INFORMATION PROCESSING METHOD

(71) Applicant: SONY CORPORATION, Tokyo (JP)

(72) Inventor: Yasutaka Fukumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 15/779,981

(22) PCT Filed: Sep. 30, 2016

(86) PCT No.: PCT/JP2016/079119
§ 371 (c)(1),
(2) Date: May 30, 2018

(87) PCT Pub. No.: WO2017/104227
PCT Pub. Date: Jun. 22, 2017

(65) Prior Publication Data
US 2018/0364787 A1    Dec. 20, 2018

Related U.S. Application Data

(60) Provisional application No. 62/269,316, filed on Dec. 18, 2015.

(51) Int. Cl.
*G06F 1/3231* (2019.01)
*G01C 21/26* (2006.01)
(Continued)

(52) U.S. Cl.
CPC ......... *G06F 1/3231* (2013.01); *G01C 21/16* (2013.01); *G01C 21/20* (2013.01); *G01C 21/26* (2013.01); *G06F 1/32* (2013.01); *G06F 1/3287* (2013.01); *G08G 1/005* (2013.01); *H04M 1/00* (2013.01); *H04W 4/027* (2013.01)

(58) Field of Classification Search
CPC ..................................................... G06F 1/3231
See application file for complete search history.

(56) References Cited

U.S. PATENT DOCUMENTS 9,009,516 B1\* 4/2015 Gabayan ............... G06F 1/3206
  713/323
9,684,353 B2\* 6/2017 Xu ......................... G06F 1/3296
(Continued)

FOREIGN PATENT DOCUMENTS

CN    102435187 A    5/2012
CN    103654759 A    3/2014
(Continued)

OTHER PUBLICATIONS

International Search Report and Written Opinion of PCT Application No. PCT/JP2016/079119, dated Nov. 1, 2016, 11 pages of ISRWO.

(Continued)

*Primary Examiner* — Kim Huynh
*Assistant Examiner* — Joshua Neveln
(74) *Attorney, Agent, or Firm* — Chip Law Group

(57) ABSTRACT

Provided is an information processing device that includes an acquisition unit configured to acquire sensing data and a mode changing unit configured to change a mode on a basis of the sensing data. The acquisition unit changes sensing data to be acquired on a basis of the change of the mode.

11 Claims, 14 Drawing Sheets

(51) Int. Cl.
  *G06F 1/32*    (2019.01)
  *H04M 1/00*   (2006.01)
  *G08G 1/005*  (2006.01)
  *G01C 21/16*  (2006.01)
  *G01C 21/20*  (2006.01)
  *G06F 1/3287* (2019.01)
  *H04W 4/02*   (2018.01)

(56) References Cited

U.S. PATENT DOCUMENTS

| | | | |
|---|---|---|---|
| 2010/0255781 A1* | 10/2010 | Wirola | G01S 19/34 |
| | | | 455/41.2 |
| 2012/0059623 A1 | 3/2012 | Sambongi | |
| 2012/0100895 A1* | 4/2012 | Priyantha | G06F 1/3293 |
| | | | 455/574 |
| 2013/0061237 A1* | 3/2013 | Zaarur | G06F 9/44 |
| | | | 718/105 |
| 2014/0081156 A1* | 3/2014 | Ohsawa | A61B 5/1123 |
| | | | 600/483 |
| 2016/0101319 A1 | 4/2016 | Tanabe et al. | |
| 2016/0245924 A1 | 8/2016 | Tanabe et al. | |

FOREIGN PATENT DOCUMENTS

| | | |
|---|---|---|
| EP | 2426511 A1 | 3/2012 |
| EP | 2997898 A1 | 3/2016 |
| JP | 2006-323761 A | 11/2006 |
| JP | 2006323761 A | 11/2006 |
| JP | 2012-052936 A | 3/2012 |
| JP | 2012052936 A | 3/2012 |
| JP | 2013-042360 A | 2/2013 |
| JP | 2014-061043 A | 4/2014 |
| JP | 2014061043 A | 4/2014 |
| JP | 2014-192735 A | 10/2014 |
| JP | 2014192735 A | 10/2014 |
| JP | 2014-226161 A | 12/2014 |
| JP | 2015-004578 A | 1/2015 |
| JP | 2015-008806 A | 1/2015 |
| JP | 2015-011442 A | 1/2015 |
| JP | 2015-087201 A | 5/2015 |
| JP | 2015087201 A | 5/2015 |
| WO | 2014/185506 A1 | 11/2014 |
| WO | 2014185506 A1 | 11/2014 |
| WO | 2015/064666 A1 | 5/2015 |

OTHER PUBLICATIONS

Notice of Reasons of Refusal for Japanese Patent Application No. 2017-556377 dated Nov. 4, 2020.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/079119 filed on Sep. 30, 2016, which claims priority benefit of U.S. Provisional Application No. 62/269,316 filed in the US Patent Office on Dec. 18, 2015. Each of the above-referenced applications is hereby incorporated herein by reference in its entirety.

TECHNICAL FIELD

The present disclosure relates to an information processing device, an information processing method, and a program.

BACKGROUND ART

In recent years, technologies of determining a motion of a person or an object, or travelling means of the person using various types of sensing data are being developed. In addition, in relation to these technologies, research and development is also being conducted for a method for reducing the amount of power consumption of an information processing device that makes determination or a sensor used for the determination, for example. Patent Literature 1 discloses a method of reducing the amount of power consumption by controlling the number of times of detection of a sensor on the basis of information concerning detection accuracy of the sensor.

CITATION LIST

Patent Literature

Patent Literature 1: JP 2013-42360A

DISCLOSURE OF INVENTION

Technical Problem

However, in the method of Patent Literature 1, it is not possible to sufficiently reduce the amount of power consumption of the information processing device or sensor. For example, the number of times of detection of the sensor can be controlled on the basis of information concerning detection accuracy of the sensor, while the sensor used itself is not changed. That is, even in a situation where a sensor may not be used effectively, the sensor is used continuously, and power is consumed.

Therefore, the present disclosure was made in view of the foregoing, and the present disclosure provides an information processing device, an information processing method, and a program being novel and improved that can reduce the amount of power consumption of an information processing device or a sensor more.

Solution to Problem

According to the present disclosure, there is provided an information processing device including: an acquisition unit configured to acquire sensing data; and a mode changing unit configured to change a mode on a basis of the sensing data. The acquisition unit changes sensing data to be acquired on a basis of a change of the mode.

In addition, according to the present disclosure, there is provided an information processing method to be executed by a computer, the information processing method including: acquiring sensing data; changing a mode on a basis of the sensing data; and changing sensing data to be acquired on a basis of a change of the mode.

In addition, according to the present disclosure, there is provided a program for causing a computer to: acquire sensing data; change a mode on a basis of the sensing data; and change sensing data to be acquired on a basis of a change of the mode.

Advantageous Effects of Invention

According to the present disclosure as described above, it is possible to reduce the amount of power consumption of an information processing device or a sensor more.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
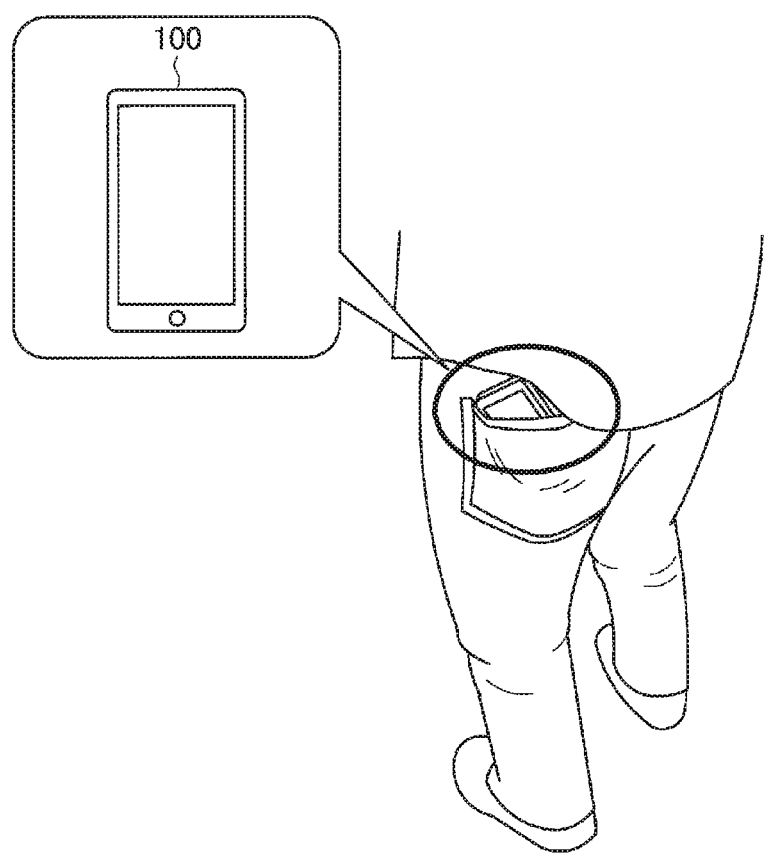
FIG. 1 is a diagram showing an information processing device according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Background
2. Overview of information processing device
3. Configuration of information processing device
4. Operations of information processing device
5. Variations
6. Application examples
7. Hardware configuration
8. Supplemental notes
9. Conclusion

1. BACKGROUND

In recent years, technologies of determining a motion of a person or an object, or travelling means of a person using various types of sensing data are being developed. Sensing data provided from various sensors is used for the determination processing, and these sensors are provided in some cases for an information processing device that performs determination processing, and are provided in other cases for an external device other than the information processing device. Here, for achieving an application of determining a motion of a person or an object, or travelling means of a person, it is required to reduce the amount of power consumption of the information processing device or sensors. In particular, since the capacity of a battery mounted on the device inevitably becomes small in a case where the device is compact, it is more important to reduce the amount of power consumption.

As a method of reducing the amount of power consumption, for example, a method of intermittently performing a data acquiring operation or determination processing can be considered. However, in the former method, loss of information for determination processing can result in inability to perform determination processing, and in the latter method, it can take long time until a user obtains a determination result, so that user satisfaction can be reduced.

In addition, Patent Literature 1 discloses a method of reducing the amount of power consumption by controlling the number of times of detection of a sensor on the basis of information concerning detection accuracy of the sensor. However, in the method of Patent Literature 1, it is not possible to sufficiently reduce the amount of power consumption of the information processing device or sensors. For example, while the number of times of detection of the sensor is controlled on the basis of information concerning detection accuracy of the sensor, the sensor used itself is not changed. That is, even in a situation where a sensor may not be used effectively, the sensor is used continuously, and power is consumed.

Therefore, the discloser of the present case has created the present disclosure paying attention to the above circumstances. According to the present disclosure, it is possible to reduce the amount of power consumption of the information processing device or sensors more. Hereinafter, an overview, a configuration, and operations of the information processing device according to one embodiment of the present disclosure, variations of the present disclosure, and application examples of the present disclosure will be described.

2. OVERVIEW OF INFORMATION PROCESSING DEVICE

The background of the present disclosure has been described above. Subsequently, an overview of an information processing device 100 according to one embodiment of the present disclosure will be described.

First, with reference to FIG. 1, an overview of the information processing device 100 according to the present embodiment will be described. FIG. 1 is a diagram showing the information processing device 100 according to one embodiment of the present disclosure. As shown in FIG. 1, the information processing device 100 according to the present embodiment is a smartphone carried by a user, and determines a motion or travelling means of the user on the basis of sensing data. Here, the information processing device 100 is a smartphone as a mere example, and the information processing device 100 may be a device other than a smartphone. For example, the information processing device 100 may be implemented as a mobile terminal such as a tablet personal computer (PC), a notebook PC, a mobile game terminal, or a digital camera. In addition, the information processing device 100 may be implemented as a fixed terminal such as a television receiver, a printer, a digital scanner, or a network storage, or an in-vehicle terminal such as a car navigation device. The information processing device 100 determines a motion of a user or an object, or travelling means of the user using sensing data, while determination of a motion or travelling means of the user will be mainly described below.

The sensing data used by the information processing device 100 for determining a motion of the user or the like may be acquired from sensors included in the information processing device 100, or may be acquired from sensors included in an external device. For example, in a case where the information processing device 100 is a mobile device such as a smartphone, the information processing device 100 may acquire sensing data from sensors included in the information processing device 100 and may perform determination of a motion of the user or the like in a situation where the information processing device 100 is carried by the user. In addition, in a case where the information processing device 100 is an installed type device such as a television receiver, the information processing device 100 may acquire sensing data from sensors included in another device carried by the user, and may perform similar determination.

The sensors used in the present embodiment are not particularly limited. For example, the sensors used in the present embodiment may include sensors capable of capturing a physical change, a chemical change, or the like resulting from a motion of a person, such as an acceleration sensor, a gyro sensor, a geomagnetic sensor, a barometric sensor, a temperature sensor, a vibration sensor, a sound sensor, a heart-beat sensor, a pulse-wave sensor, a proximity sensor, a luminance sensor, a pressure sensor, a position sensor, a perspiration sensor, a pH sensor, a humidity sensor, and an infrared sensor.

Figure 2:
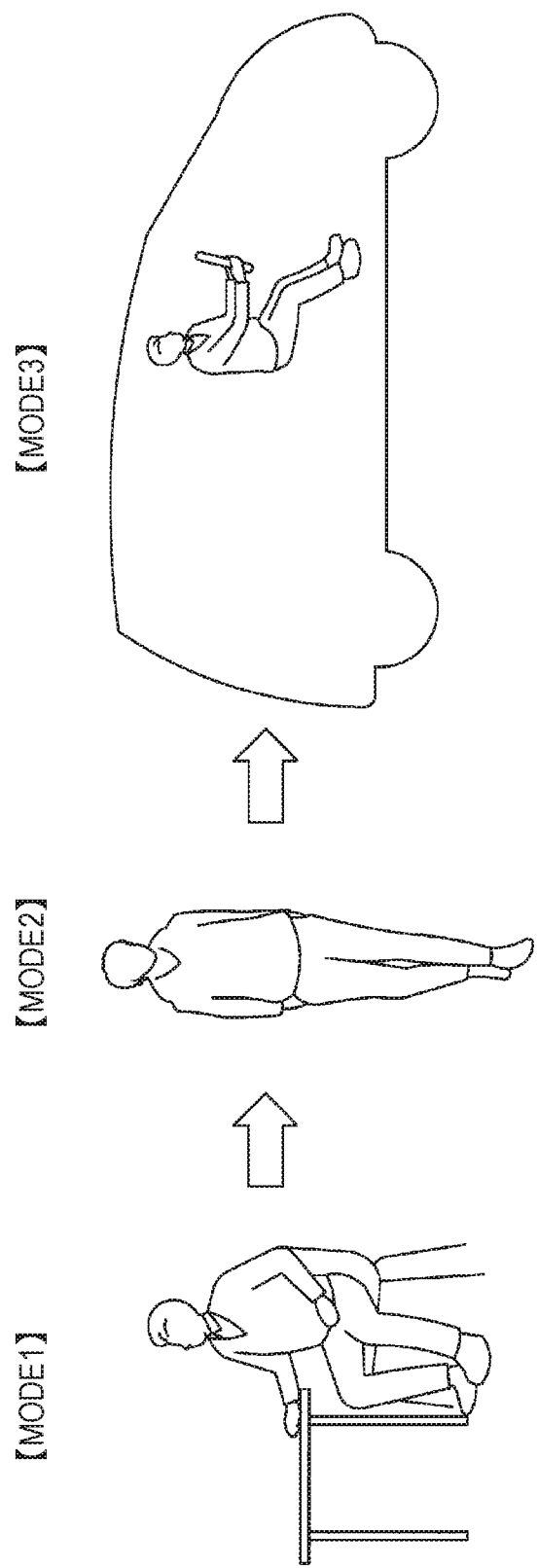
FIG. 2 is a diagram showing a mode 1 to a mode 3 according to the present embodiment.

The information processing device 100 according to the present embodiment changes the mode step by step on the basis of a determination result of a motion of a person or the like, and changes sensing data to be acquired on the basis of the mode. Here, with reference to FIG. 2, modes according to the present embodiment will be described. FIG. 2 is a diagram showing a mode 1 to a mode 3 according to the present embodiment. As shown in FIG. 2, three types of modes (the mode 1 to the mode 3) exist in the present embodiment. The mode 1 is a mode corresponding to a state in which the user is hardly moving or travelling, such as a state in which the user is sitting on a chair. The mode 2 is a mode corresponding to a state in which the user has started travelling, or is moving and stopping. The mode 3 is a mode corresponding to a state in which the user is moving or travelling continuously, such as a case where the user is travelling riding in a car. In addition, a mode applied to the time when the user is close to a state of continuously making a stop will be called a first mode as well, and a mode applied to the time when the user is close to a state of continuously moving will be called a second mode as well.

The discloser of the present case has paid attention to that the user's motion states can be classified into a plurality of modes such as the mode 1 to the mode 3, and the mode transitions step by step. Describing more specifically, in a case where the user, in a state of not travelling, travels riding in a car, the mode transitions from the mode 1 to the mode 2, and further transitions from the mode 2 to the mode 3, as shown in FIG. 2. In this case, the mode does not transition from the mode 1 to the mode 3 without passing through the mode 2, and as a matter of course, the mode does not transition from the mode 3 to the mode 1 without passing through the mode 2.

Figure 3:
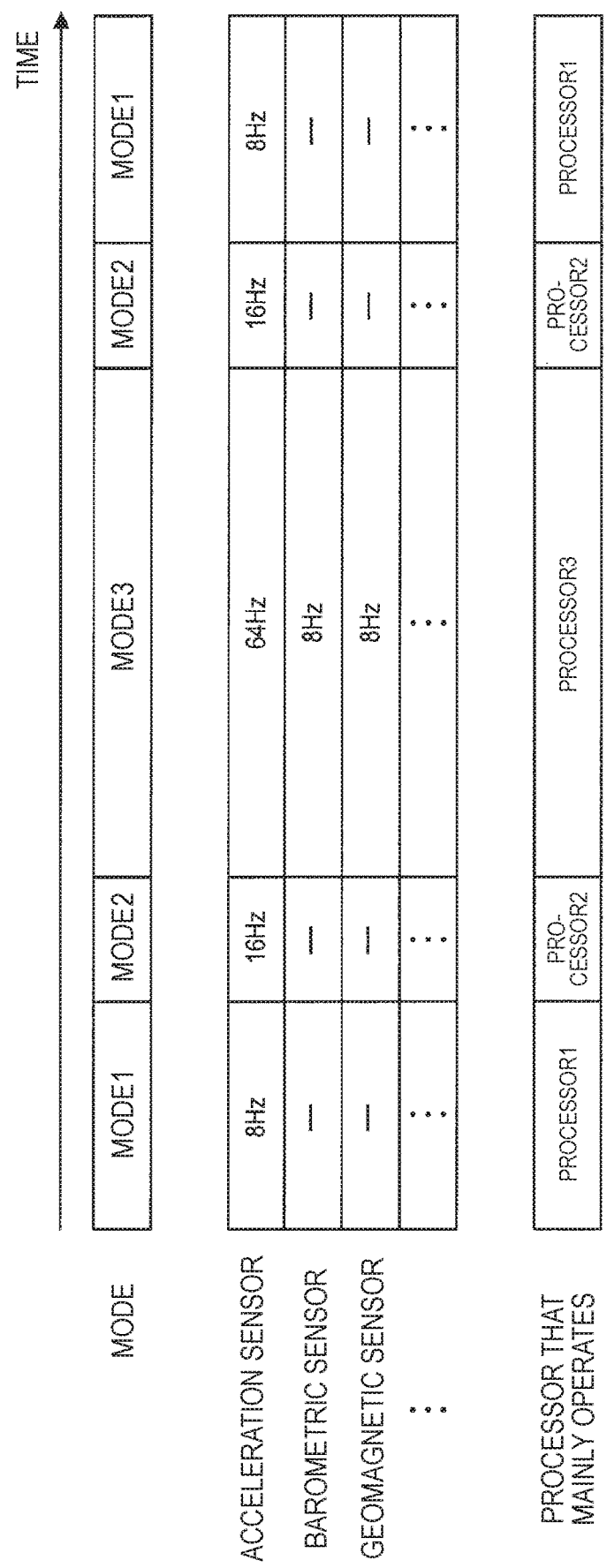
FIG. 3 is a diagram showing a relationship among modes, sensors, and processors.

Then, the information processing device 100 according to the present embodiment changes a sensor to be used for determination processing in accordance with the mode. Here, with reference to FIG. 3, changing a sensor to be used for determination processing in accordance with the mode will be described more specifically. FIG. 3 is a diagram showing a relationship among modes, sensors, and processors. FIG. 3 illustrates an example of a sensor used in each mode, a sampling frequency of sensing data to be acquired, and a processor to be mainly used in a case where the mode transitions in the order of the mode 1, the mode 2, the mode 3, the mode 2, and the mode 1.

As shown in FIG. 3, the information processing device 100 uses a larger number of sensors in a mode in which the user is close to the state of travelling than in a mode in which the user is close to the state of not travelling. For example, the information processing device 100 only uses the acceleration sensor in the mode 1 and the mode 2, and also uses the barometric sensor, the geomagnetic sensor, and the like other than the acceleration sensor in the mode 3. Here, sensors used in each mode are mere examples, and may be changed according to necessity.

This allows the information processing device 100 to use sensors suitable for the user's motion state, and to reduce the amount of power consumption. Describing more specifically, since the user is in a state of hardly travelling or just having started travelling in the mode 1 and the mode 2, the information processing device 100 can sufficiently perform determination processing only with sensing data from the acceleration sensor. Therefore, the information processing device 100 can reduce the amount of power consumption as compared with a system in which sensors used in each mode are not changed. On the other hand, since the motion or travelling of the user is continuous in a case where the mode becomes the mode 3, the information processing device 100 can determine a motion of the user or the like in more detail by increasing sensors to be used or using sensors that consume a larger amount of power. Therefore, the information processing device 100 can reduce the amount of power consumption and can perform more detailed determination processing, as compared with a system in which sensors used in each mode are not changed.

In addition, the information processing device 100 changes the sampling frequency in accordance with the mode. Describing more specifically, the information processing device 100 acquires sensing data at a higher sampling frequency in a mode in which the user is close to the state of travelling than in a mode in which the user is close to the state of not travelling. For example, the information processing device 100 sets the sampling frequency in the mode 1 at 8 Hz which is relatively lower than in the mode 2 and the mode 3. Then, as the mode transitions to the mode 2 and the mode 3, the information processing device 100 raises the sampling frequency to 16 Hz (the mode 2) and 64 Hz (the mode 3) step by step. Here, the sampling frequency in each mode is a mere example, may be changed according to necessity.

This allows the information processing device 100 to set a sampling frequency suitable for the user's motion state, and to reduce the amount of power consumption. Describing more specifically, since the user is hardly travelling in the mode 1, the information processing device 100 can sufficiently perform determination processing even with the sampling frequency set low. Therefore, the information processing device 100 can reduce the amount of power consumption as compared with a system in which the sampling frequency is not changed in each mode. On the other hand, since a motion or travelling of the user becomes continuous as the mode transitions to the mode 2 and the mode 3, the information processing device 100 can determine a motion of the user or the like in more detail by raising the sampling frequency step by step. Therefore, the information processing device 100 can reduce the amount of power consumption and can perform more detailed determination processing as compared with a system in which the sampling frequency is not changed in each mode.

In addition, the information processing device 100 changes a processor to be used in accordance with the mode. Describing more specifically, the information processing device 100 is provided with a plurality of processors different in processing capability or the amount of power consumption, and the information processing device 100 uses a processor having a higher processing capability in a mode in which the user is close to the state of travelling than in a mode in which the user is close to the state of not travelling. For example, the information processing device 100 uses a processor 1 having a low processing capability and consuming a smaller amount of power in the mode 1, uses a processor 2 having a processing capability higher than the processor 1 in the mode 2, and uses a processor 3 having a processing capability higher than the processor 2 in the mode 3.

This allows the information processing device 100 to use a processor suitable for the user's motion state, and can reduce the amount of power consumption. Describing more specifically, since the sampling frequency of sensing data is low in the mode 1, the information processing device 100 can perform processing sufficiently even using the processor 1 having a low processing capability. On the other hand, since the sampling frequency of sensing data becomes higher as the mode transitions to the mode 2 and the mode 3, the information processing device 100 performs processing using the processor 2 or the processor 3 having a high processing capability. In general, since the amount of power consumption increases as the processing capability of the processor becomes higher, the information processing device 100 can reduce the amount of power consumption as compared with a system in which the processor is not changed in each mode.

In addition, in accordance with the mode, the information processing device 100 may change the setting of the processor or the like rather than changing a processor to be used. Describing more specifically, the information processing device 100 may change the setting of an applied voltage to the processor, an operation clock, a filtering coefficient, a trigger threshold value, a data length in First-In First-Out (FIFO) processing, or the like in accordance with the mode. Accordingly, even in a case where the information processing device 100 is provided with a single processor, the information processing device 100 can reduce the amount of power consumption by changing the setting of the processor in accordance with the mode.

In addition, the information processing device 100 changes a sensor to be used in accordance with a determination result of a motion of the user or the like. Describing more specifically, the information processing device 100 determines a motion or travelling means of the user to activate a more effective sensor and to stop an ineffective sensor in accordance with the determination result. For example, in a case where it is determined that the user is travelling riding in an elevator or on an escalator, the user is highly likely to be indoors, and a global positioning system (GPS) sensor may be unable to receive a signal from a satellite, so that the information processing device 100 stops the GPS sensor. In addition, in a case where it is determined that the user is riding on a bicycle, noise caused by wind noise is likely to occur, so that the information processing device 100 activates a plurality of sound recognition microphones (sound sensors).

In this manner, by using a sensor suitable for a motion or travelling means of the user, or an environment in which the user is located and not using an unsuitable sensor on the basis of a determination result, the information processing device 100 can reduce the amount of power consumption and can perform more detailed determination processing as compared with a system in which a sensor to be used is not changed in accordance with a determination result.

In addition, in accordance with a determination result, the information processing device 100 may change the sensor setting or the like rather than changing a sensor to be used. Describing more specifically, the information processing device 100 may change the setting of a sensor operation mode, resolution, sensitivity, range, a low-pass filter, or the like in accordance with a determination result. For example, in a case where it is determined that the accuracy of the determination result is low, the information processing device 100 may raise the sensor resolution and perform determination processing again.

2. DEVICE CONFIGURATION

Figure 4:
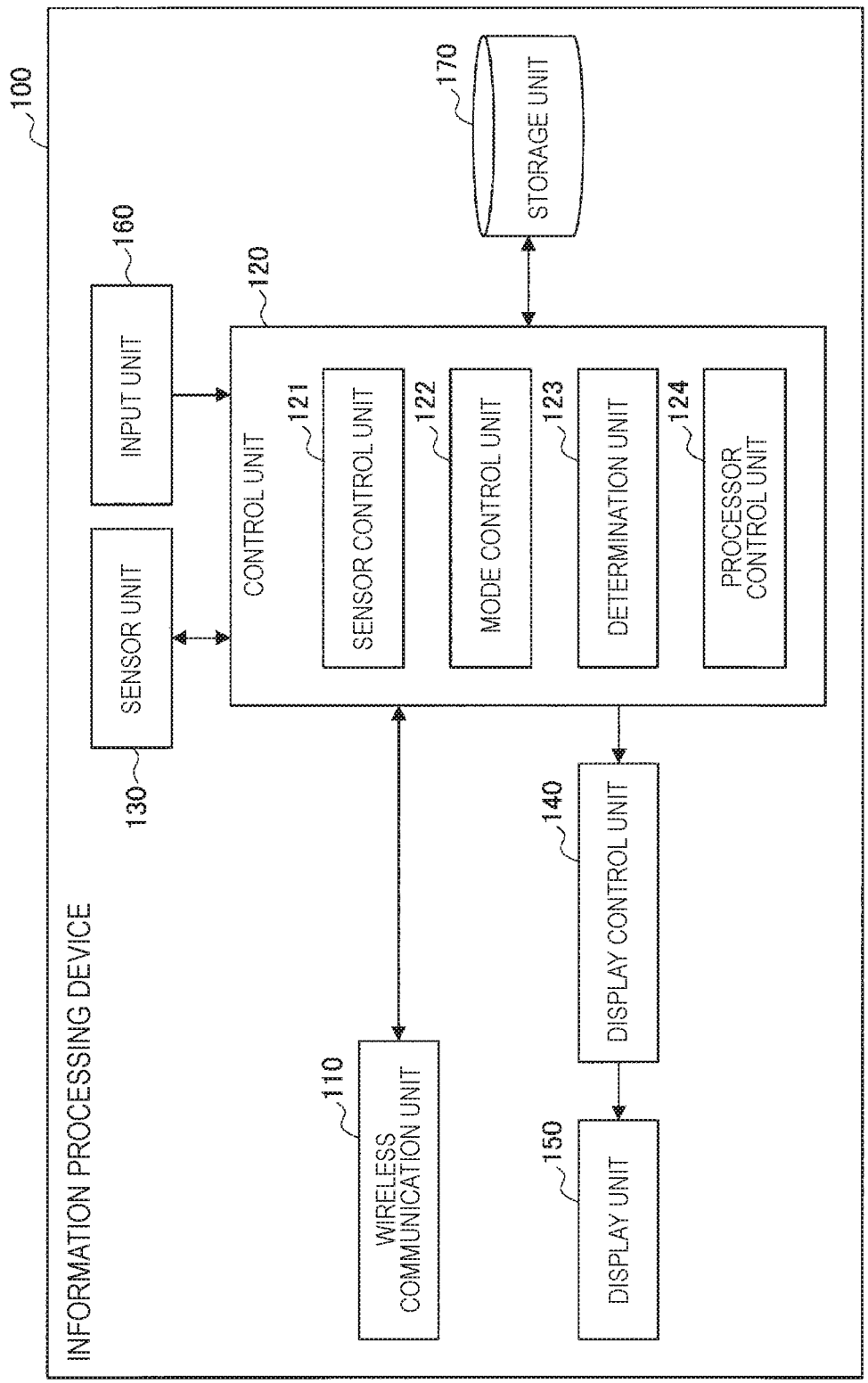
FIG. 4 is a diagram showing a configuration of the information processing device according to the present embodiment.

An overview of the information processing device 100 according to one embodiment of the present disclosure has been described above. Subsequently, with reference to FIG. 4, a configuration of the information processing device 100 according to the present embodiment will be described. FIG. 4 is a diagram showing a configuration of the information processing device 100 according to the present embodiment.

As shown in FIG. 4, the information processing device 100 according to the present embodiment includes a wireless communication unit 110, a control unit 120, a sensor unit 130, a display control unit 140, a display unit 150, an input unit 160, and a storage unit 170.

(Wireless Communication Unit 110)

The wireless communication unit 110 communicates with an external device. For example, the wireless communication unit 110 receives sensing data from an external device including sensors. In addition, by transmitting control information provided from a sensor control unit 121 to the external device including sensors, the wireless communication unit 110 allows the information processing device 100 to control the sensors of the external device.

(Control Unit 120)

The control unit 120 controls overall processing of the information processing device 100. Describing more specifically, the control unit 120 controls not only the processing of determining a motion or travelling means of the user, but also processing concerning a call that a smartphone has, imaging processing performed by a camera, processing concerning e-mail, or the like. Hereinafter, controlling of the processing of determining a motion or travelling means of the user will be mainly described. The control unit 120 includes the sensor control unit 121, a mode control unit 122, a determination unit 123, and a processor control unit 124. The control unit 120 functions as an acquisition unit and a mode changing unit.

(Sensor Control Unit 121)

The sensor control unit 121 controls sensors included in the information processing device 100 or sensors included in an external device. Describing more specifically, the sensor control unit 121 determines a sensor to be used and the sampling frequency in accordance with the mode, and controls each sensor. For example, the sensor control unit 121 controls each sensor in line with the sensors and the sampling frequencies shown in FIG. 3.

In addition, as described above, the sensor control unit 121 determines a sensor to be used in accordance with a determination result, and controls each sensor. For example, besides the above example, the sensor control unit 121 may stop a GPS sensor in a case where the state in which the user is not travelling has continued for a predetermined time or longer. In addition, a state in which the user is travelling has continued for a predetermined time or longer, the sensor control unit 121 may activate the GPS sensor. In addition, a state in which the user is not walking or not running has continued for a predetermined time or longer, the sensor control unit 121 may stop a pedometer (or a sensor that senses an action of walking or an action of running). In addition, a state in which the user is travelling riding in a train, a bus, or a car, or not travelling has continued for a predetermined time or longer, the sensor control unit 121 may stop the heart-beat sensor assuming that the heart rate is constant. In addition, the sensor control unit 121 may add or change a sensor to be used in order to increase the accuracy of determination processing. For example, in a case where the likelihood of a determination result is low or the like, the sensor control unit 121 may increase the accuracy of determination processing by activating the gyro sensor and performing sensing of a user's attitude or sensing of a turn (a direction of rotation) using sensing data from the sensor. In addition, in a case where it is determined that the user is in a state of making a stop (Stay), the sensor control unit 121 may enable more detailed determination processing such as causing determination to be made regarding whether the user is making a stop in a state of sitting down or making a stop in a state of standing by activating the gyro sensor. Here, the gyro sensor tends to consume a relatively large amount of power as compared with other sensors. Therefore, by activating a sensor that consumes a large amount of power like the gyro sensor according to necessity as described above rather than always activating the sensor, the sensor control unit 121 can reduce the amount of power consumption by activating the sensor.

In this manner, by using a sensor suitable for a motion or travelling means of the user, or an environment in which the user is located and not using an unsuitable sensor on the basis of a determination result, the sensor control unit 121 can reduce the amount of power consumption, and can perform determination processing with higher accuracy as compared with a system in which a sensor to be used is not changed in accordance with a determination result.

(Mode Control Unit 122)

The mode control unit 122 controls the mode in the information processing device 100. Describing more specifically, the mode control unit 122 sets the mode at the mode 1 in a case where it is determined by the determination unit 123 that the user is hardly moving or travelling. In addition, the mode control unit 122 changes the mode to the mode 2 in a case where it is determined by the determination unit 123 that the user has started travelling, or is moving and stopping. In addition, the mode control unit 122 changes the mode to the mode 3 in a case where it is determined by the determination unit 123 that the user is moving or travelling continuously. In addition, as described above, the mode control unit 122 changes the mode step by step.

(Determination Unit 123)

The determination unit 123 includes the processor 1 to the processor 3, and determines a motion or travelling means of the user using sensing data. For example, in a case where the mode 1 has been set, the determination unit 123 senses a motion of the user on the basis of a result of hardware processing performed by the processor 1. Describing more specifically, the processor 1 calculates an acceleration vector in a three-dimensional space using accelerations in directions of respective axes of the X axis, Y axis, and Z axis sensed by the acceleration sensor. Then, the processor 1 calculates a norm of the difference between acceleration vectors at two different sampled timings. Then, the processor 1 senses that the user has started moving on the basis of that the norm exceeds a predetermined threshold value.

Here, the determination unit 123 achieves these types of processing by hardware, not by software. Describing more specifically, since the user is hardly moving or travelling in the mode 1, the determination unit 123 performs processing only using hardware rather than performing complicated processing using software. It is thereby possible to reduce the amount of power consumption that would be used for control of software. Note that this control is a mere example, and software processing may also be performed in the mode 1.

In addition, in a case where the mode 2 has been set, the determination unit 123 determines a "class" equivalent to a motion or travelling means of the user on the basis of a result of software processing performed by the processor 2. The class in the mode 2 includes two types of classes of "Stay (not travelling)/Not Stay (travelling)", for example (hereinafter, processing of determining the two types of classes will be called "2-class determination processing").

Describing the class determination processing in the mode 2 more specifically, the determination unit 123 acquires sensing data of four seconds from the acceleration sensor every two seconds, and extracts a feature amount of sensing data. Then, the determination unit 123 performs 2-class determination processing by inputting the feature amount into a determination model for the 2-class determination processing generated by machine learning. Here, that the processing performed in the mode 2 is the 2-class determination processing is a mere example, and may be changed according to necessity. In addition, the interval at which data acquisition is performed in the mode 2 and the data amount to be acquired are mere examples, and may be changed according to necessity.

In addition, in a case where the mode 3 has been set, the determination unit 123 determines the class on the basis of a result of software processing performed by the processor 3. The class in the mode 3 includes, for example, thirteen types of classes of "Stay, Walk, Run, Upstairs (going up the stairs), Downstairs (going down the stairs), EscUP (riding on the up escalator), EscDown (riding on the down escalator), ElevUP (riding in the up elevator), ElevDown (riding in the down elevator), Train, Bus, Car, and Bicycle" (hereinafter, processing of determining the thirteen types of classes will be called "13-class determination processing").

Describing the class determination processing in the mode 3 more specifically, the determination unit 123 acquires sensing data of five seconds from each sensor every five seconds, and extracts the feature amount of sensing data. Then, the determination unit 123 performs the 13-class determination processing by inputting the feature amount into a determination model for the 13-class determination processing generated by machine learning. Here, that the processing performed in the mode 3 is the 13-class determination processing is a mere example, and may be changed according to necessity. In addition, the interval at which data acquisition is performed in the mode 3 and the data amount to be acquired are mere examples, and may be changed according to necessity.

Figure 5:
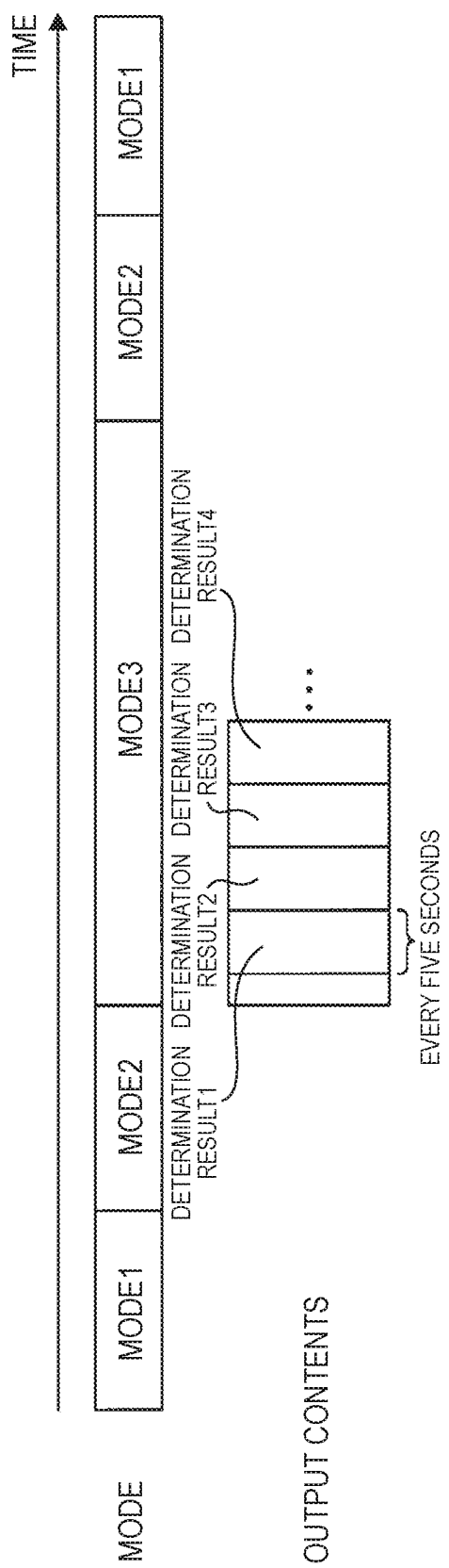
FIG. 5 is a diagram showing output contents of a determination unit in each mode.

Subsequently, with reference to FIG. 5, an output of class determination processing made by the determination unit 123 will be described. FIG. 5 is a diagram showing an example of output contents of the determination unit 123 in each mode. As shown in FIG. 5, the determination unit 123 may output a result of class determination processing in the mode 3, and may not output a result of processing in the mode 1 and the mode 2. However, FIG. 5 is a mere example, and the determination unit 123 may output a result of processing also in the mode 1 and the mode 2. For example, the determination unit 123 may output a result of 2-class determination processing in the mode 2.

(Processor Control Unit 124)

The processor control unit 124 controls the processors in the information processing device 100. Describing more specifically, the processor control unit 124 determines a processor to be mainly used in accordance with the mode. For example, the processor control unit 124 operates such that the processor 1 is mainly used in the mode 1, operates such that the processor 2 is mainly used in the mode 2, and operates such that the processor 3 is mainly used in the mode 3, as shown in FIG. 3. Here, the processor used in each mode may not be one. For example, in a case where the mode 2 has been set, not only the processor 2 but also the processor 1 may operate. In addition, in a case where the mode 3 has been set, not only the processor 3 but also the processor 1 or the processor 2 may operate.

(Sensor Unit 130)

The sensor unit 130 generates sensing data by being controlled by the sensor control unit 121. Describing more specifically, the sensor unit 130 senses a physical change, a chemical change, or the like resulting from a motion of the user by being controlled by the sensor control unit 121, and generates sensing data. Then, the sensor unit 130 provides the generated sensing data for the control unit 120. The sensor unit 130 may include an acceleration sensor, a gyro sensor, a geomagnetic sensor, a barometric sensor, a temperature sensor, a vibration sensor, a sound sensor, a heartbeat sensor, a pulse-wave sensor, a proximity sensor, a luminance sensor, a pressure sensor, a position sensor, a perspiration sensor, a pH sensor, a humidity sensor, an infrared sensor, and the like, as described above.

(Display Control Unit 140)

The display control unit 140 controls the display unit 150. Describing more specifically, on the basis of processing performed by the control unit 120, the display control unit 140 determines the contents of information to be displayed on the display unit 150, and provides the information for the display unit 150.

(Display Unit 150)

The display unit 150 displays various types of information. Describing more specifically, the display unit 150 displays various types of information in various formats such as images, text, and graphs by being controlled by the display control unit 140, and visually notifies the user of the information. Various contents may be included in the various types of information.

(Input Unit 160)

The input unit 160 accepts an input from the user. Describing more specifically, the input unit 160 includes a button or a touch panel, and the like, and accepts an input manipulation made by the user using them. The input unit 160 provides the information input by the user for the control unit 120.

(Storage Unit 170)

The storage unit 170 stores various types of information. Describing more specifically, the storage unit 170 stores mode history information, sensor operation history information, processor operation history information, sensing data, or a program for use in class determination processing of the determination unit 123, and the like.

4. OPERATIONS OF INFORMATION PROCESSING DEVICE

A configuration of the information processing device 100 according to the present embodiment has been described above. Subsequently, with reference to FIG. 6 and FIG. 7, operations of the information processing device 100 will be described.

(4-1. Operations Concerning Mode Control, Sensor Control, and Determination)

Figure 6:
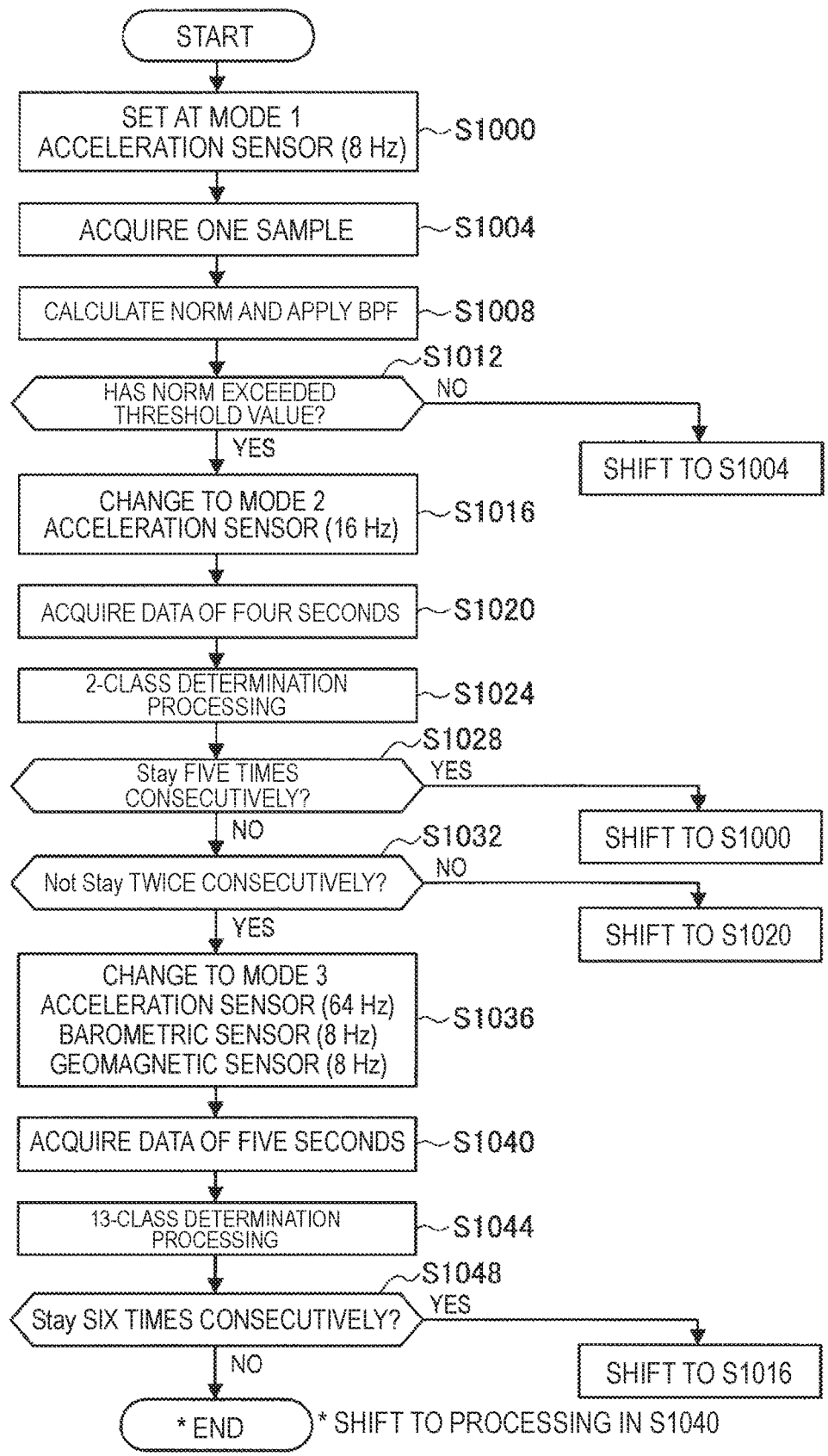
FIG. 6 is a flowchart showing operations concerning mode control, sensor control, and determination performed by the information processing device according to the present embodiment.

First, with reference to FIG. 6, operations concerning mode control, sensor control, and determination performed by the information processing device 100 will be described. FIG. 6 is a flowchart showing operations concerning mode control, sensor control, and determination performed by the information processing device 100 according to the present embodiment.

In step S1000 of FIG. 6, the mode control unit 122 sets the mode at the mode 1 (the acceleration sensor: 8 Hz). In step S1004, the determination unit 123 acquires sensing data of one sample from the acceleration sensor. In step S1008, the processor 1 included in the determination unit 123 calculates an acceleration vector in a three-dimensional space using the sensing data of the acceleration sensor, and calculates a norm of the difference between the vector and a vector obtained by previous sampling. Thereafter, for the calculated norm, frequencies not included in a frequency domain that may be recognized as a motion of the user are removed by a band-pass filter (hereinafter called "BPF" for convenience).

Thereafter, in a case where the norm has exceeded a predetermined threshold value (step S1012/Yes), the mode control unit 122 changes the mode to the mode 2 in step S1016 (the acceleration sensor: 16 Hz). In step S1012, in a case where the norm has not exceeded a predetermined threshold value (step S1012/No), the process is shifted to step S1004. In step S1020, the determination unit 123 acquires sensing data of four seconds from the acceleration sensor. In step S1024, the determination unit 123 performs 2-class determination processing using the sensing data.

In a case where the 2-class determination processing has resulted in Stay five times consecutively (step S1028/Yes), the process is shifted to step S1000, and the mode control unit 122 changes the mode from the mode 2 to the mode 1. In a case where the 2-class determination processing has not resulted in Stay five times consecutively (step S1028/No), and has resulted in Not Stay twice consecutively (step S1032/Yes), the mode control unit 122 changes the mode from the mode 2 to the mode 3 in step S1036 (the acceleration sensor: 64 Hz, the barometric sensor: 8 Hz, the geomagnetic sensor: 8 Hz). In step S1032, in a case where the 2-class determination processing has not resulted in Not Stay twice consecutively (step S1032/No), the mode control unit 122 does not change the mode, and the process is shifted to step S1020.

In step S1040, the determination unit 123 acquires sensing data of five seconds from each sensor. In step S1044, the determination unit 123 performs 13-class determination processing using the sensing data. Unless the 13-class determination processing results in Stay six times consecutively (step S1048/No), the determination unit 123 continues data acquisition (step S1040) and the 13-class determination processing (step S1044) (in FIG. 6, processing corresponding to step S1048/No is illustrated as "END" for convenience). In step S1048, in a case where the 13-class determination processing results in Stay six times consecutively (step S1048/Yes), the process is shifted to step S1016, and the mode control unit 122 changes the mode from the mode 3 to the mode 2.

(4-2. Sensor Control Operation in Accordance with Result of Class Determination Processing)

Figure 7:
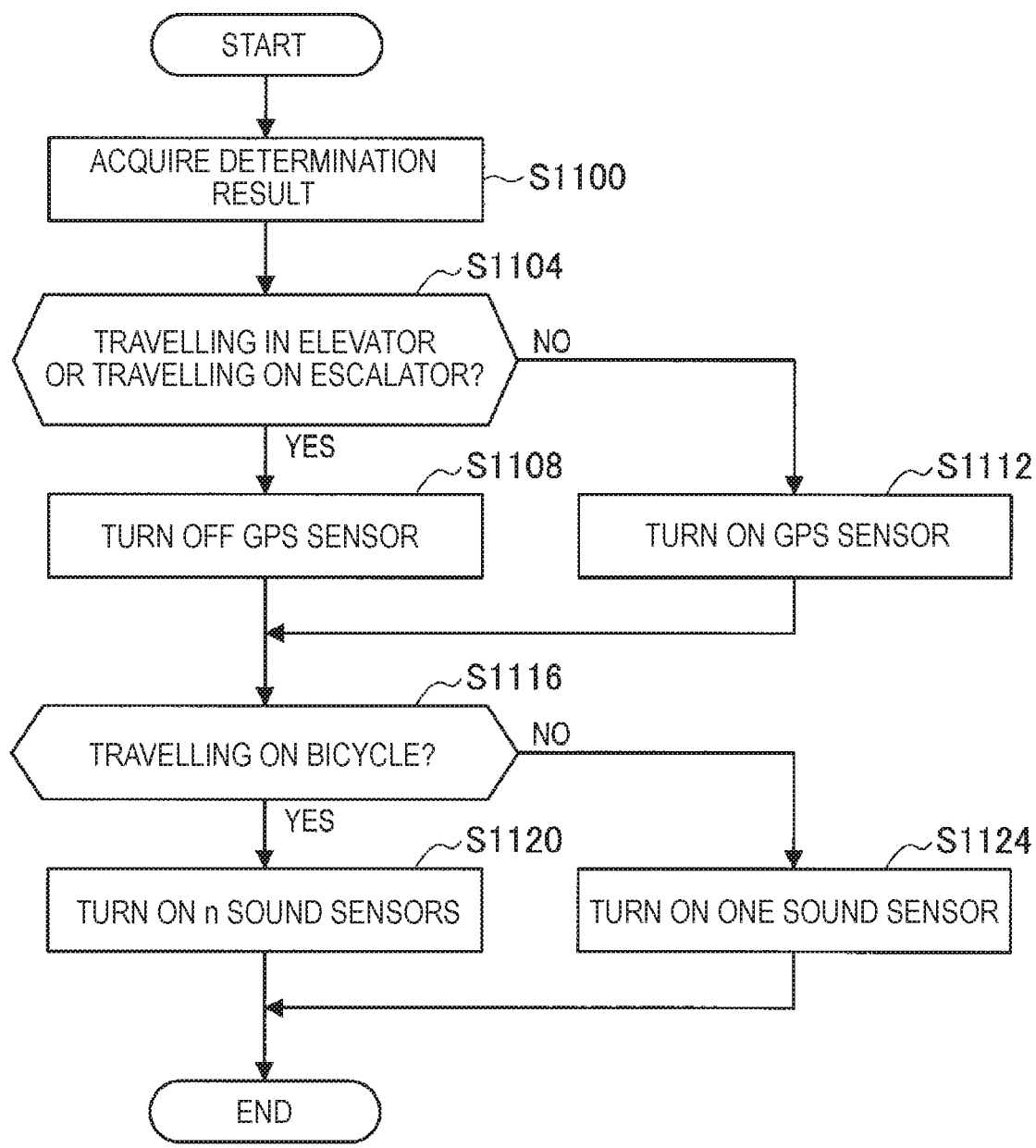
FIG. 7 is a flowchart showing a sensor control operation in accordance with a result of class determination processing performed by the determination unit.

Subsequently, with reference to FIG. 7, a sensor control operation performed by the determination unit 123 in accordance with a result of class determination processing will be described. FIG. 7 is a flowchart showing a sensor control operation in accordance with a result of class determination processing performed by the determination unit 123.

In step S1100, the sensor control unit 121 acquires information concerning a result of class determination processing from the determination unit 123. Then, in a case where it is determined that the user is travelling riding in an elevator or on an escalator (step S1104/Yes), the user is highly likely to be indoors, and the GPS sensor may be unable to receive a signal from a satellite, so that in step S1108, the sensor control unit 121 stops the GPS sensor (in a case where the GPS sensor is in a stopped state, keeps the GPS sensor in the stopped state). In step S1104, in a case where it is determined that the user is not travelling riding in an elevator or on an escalator (step S1104/No), the sensor control unit 121 activates the GPS sensor in step S1112 (in a case where the GPS sensor is in an activated state, keeps the GPS sensor in the activated state).

In addition, in a case where it is determined that the user is travelling riding on a bicycle (step S1116/Yes), the influence of noise caused by wind noise can be significant, so that the sensor control unit 121 activates a plurality of sound recognition microphones (sound sensors) in step S1120. In step S1116, in a case where it is determined that the user is not travelling riding on a bicycle (step S1116/No), the sensor control unit 121 activates one sound recognition microphone (sound sensor) in step S1124. Here, the sensor control operation shown in FIG. 7 is a mere example, and may be changed according to necessity.

In addition, although not shown, the control unit 120, the display control unit 140, or the like may control a device or a function other than sensors in accordance with a determination result. For example, in a case where a state in which the user is travelling riding in a train or a car has continued for a predetermined time or longer, it can be difficult to carry out Wi-Fi (Registered Trademark) communication, so that the control unit 120 may change wireless communication to be performed by the wireless communication unit 110 from Wi-Fi communication to cellular communication (4G mobile communication or the like). Accordingly, the control unit 120 can reduce power that would be consumed for searching for an access point in Wi-Fi communication.

In addition, in a case where a state in which the user is running or going up the stairs has continued for a predetermined time or longer, the user may be unaware of a notification by sound or vibration, so that the control unit 120 may not perform processing for notification. Accordingly, the control unit 120 can reduce power that would be consumed for the processing. In addition, in a case where a state in which the user is travelling riding on a bicycle has continued for a predetermined time or longer, it is dangerous for the user to check the display (the display unit 150), so that the display control unit 140 may stop the display (the display unit 150). Accordingly, the display control unit 140 can reduce power that would be consumed for display performed by the display unit 150.

5. VARIATIONS

Operations of the information processing device 100 according to the present embodiment have been described above. Subsequently, variations of the present disclosure will be described.

(5-1. First Variation)

First, with reference to FIG. 8 to FIG. 10, a first variation of the present disclosure will be described. The first variation is a case in which each mode is hierarchized. Describing more specifically, each mode according to the first variation may be divided into a plurality of levels. For example, the mode 1 may be divided into two levels of a mode 1-1 and a mode 1-2. As a matter of course, not only the mode 1, but also the mode 2 and the mode 3 may be divided into a plurality of levels, and may be divided into three levels or more, for example, other than two levels. This allows the information processing device 100 to set a sensor to be used, sampling frequency of sensing data, processor to be used in more detail. For example, the sampling frequency in the mode 1 is 8 Hz in the above-described embodiment, whilst in the first variation, the mode 1 may be divided into two levels of the mode 1-1 and the mode 1-2, the sampling frequency in the mode 1 may be set at 1 Hz, and the sampling frequency in the mode 1-2 may be set at 8 Hz.

Then, in the above-described embodiment, the 2-class determination processing is performed in the mode 2, and the 13-class determination processing is performed in the mode 3, whilst class determination processing may also be hierarchized in the first variation. Here, with reference to FIG. 8, hierarchization of class determination processing will be described more specifically. FIG. 8 is a diagram showing an example of hierarchized class determination processing in the first variation.

Figure 8:
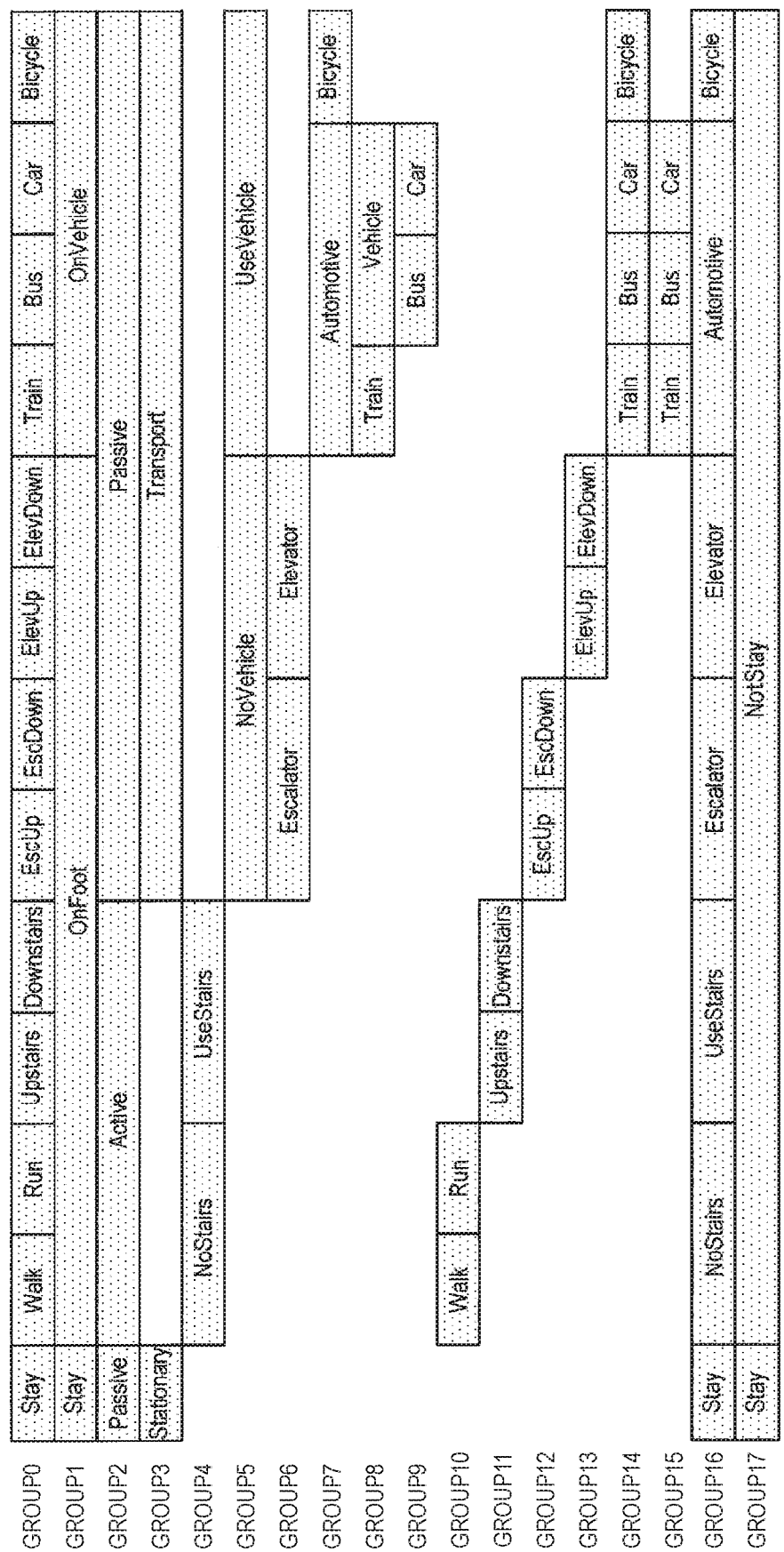
FIG. 8 is a diagram showing an example of hierarchized class determination processing in a first variation.

As shown in FIG. 8, class determination processing hierarchized into eighteen types (a group 0 to a group 17) exists in the first variation. The eighteen types shown in FIG. 8 are mere examples, and may be changed according to necessity. The information processing device 100 may apply any of the groups shown in FIG. 8 to a hierarchized mode. For example, the group 1 may be applied to a mode 3-1, and the group 0 may be applied to a mode 3-2. That is, the information processing device 100 may perform 3-class determination processing of "Stay/On Foot/On Vehicle" in the mode 3-1, and may then perform the 13-class determination processing in the mode 3-2. Accordingly, the information processing device 100 can perform sensor control and system control based on a determination result in more detail, so that the information processing device 100 is capable of selecting a more suitable sensor, sampling frequency, processor, and the like and performing setting in accordance with each mode. Therefore, the amount of power consumption of the information processing device 100 or sensors may be reduced more.

Then, with reference to FIG. 9, operations of the information processing device 100 according to the first variation will be described. FIG. 9 is a flowchart showing operations of the information processing device 100 in a case where the mode 1 is divided into two levels of the mode 1-1 and the mode 1-2.

Figure 9:
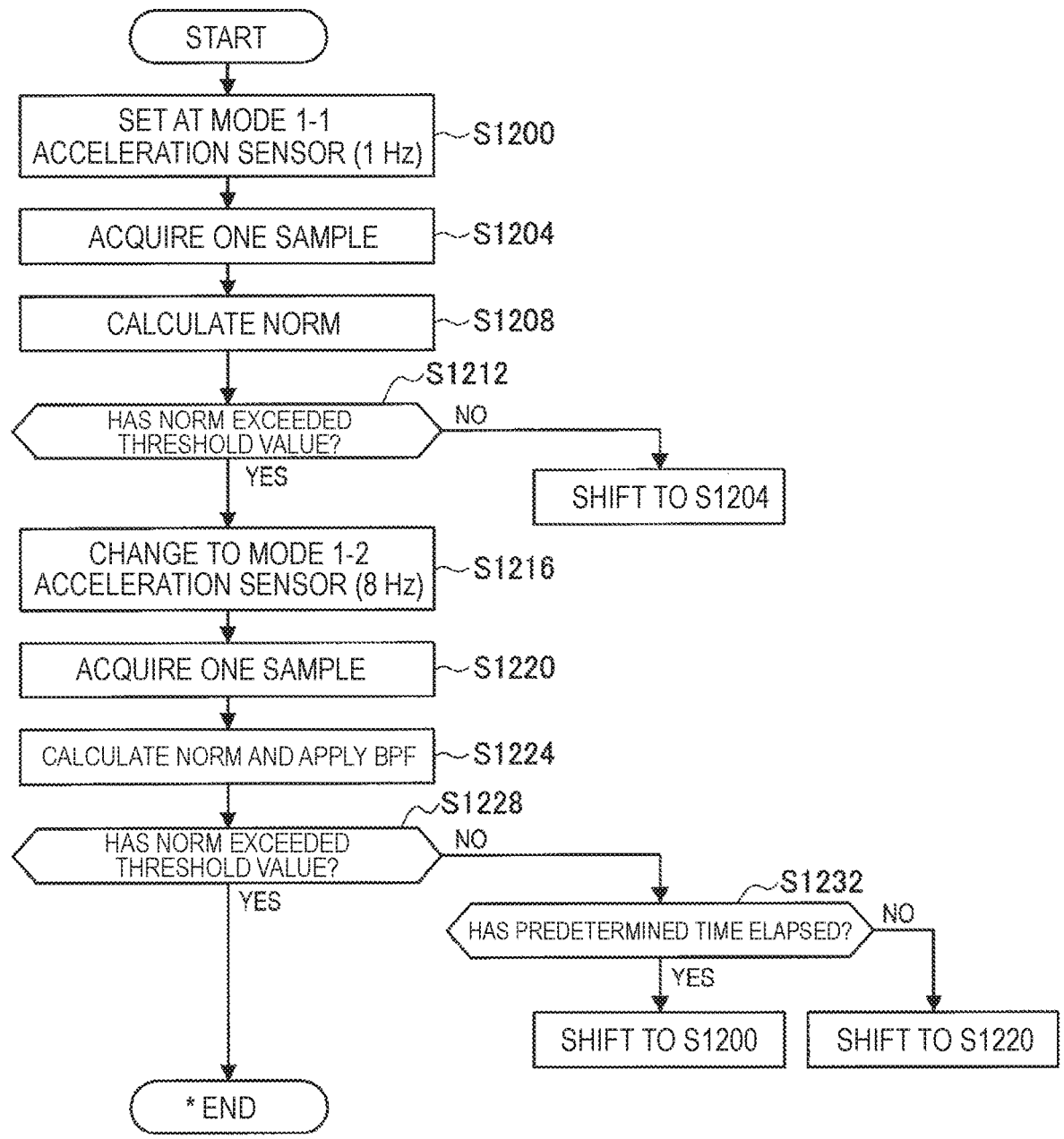
FIG. 9 is a flowchart showing an operation for class determination in the first variation.

In step S1200 of FIG. 9, the mode control unit 122 sets the mode at the mode 1-1 (the acceleration sensor: 1 Hz). In step S1204, the determination unit 123 acquires sensing data of one sample from the acceleration sensor. In step S1208, the processor 1 included in the determination unit 123 calculates an acceleration vector in a three-dimensional space using the sensing data, and calculates a norm of the difference between the vector and a vector obtained by previous sampling. Here, in the mode 1-1, removal of frequencies not included in a frequency domain that may be recognized as a motion of the user performed by the BPF is not performed unlike step S1008 of FIG. 6.

Thereafter, in a case where the norm has exceeded a predetermined threshold value (step S1212/Yes), the mode control unit 122 changes the mode to the mode 1-2 in step S1216 (the acceleration sensor: 8 Hz). In step S1212, in a case where the norm has not exceeded a predetermined threshold value (step S1212/No), the process is shifted to step S1204. In step S1220, the determination unit 123 acquires sensing data of one sample from the acceleration sensor. In step S1224, the processor 1 included in the determination unit 123 calculates a norm, and for the norm, frequencies not included in a frequency domain that may be recognized as a motion of the user are removed by the BPF.

Thereafter, in a case where the norm has exceeded a predetermined threshold value (step S1228/Yes), the mode control unit 122 changes the mode to the mode 2 (in FIG. 9, processing corresponding to step S1228/Yes is illustrated as "END" for convenience). In step S1228, in a case where the norm has not exceeded a predetermined threshold value (step S1228/No) and in a case where a predetermined time has elapsed from the timing when the mode is set at 1-2 (step S1232/Yes), the process is shifted to S1200, and the mode control unit 122 changes the mode from the mode 1-2 to the mode 1-1. In step S1232, in a case where a predetermined time has not elapsed from the timing when the mode is set at 1-2 (step S1232/No), the mode control unit 122 does not change the mode, and the process is shifted to step S1220.

Then, with reference to FIG. 10, operations of the information processing device 100 in a case where the mode 3 is divided into a plurality of levels will be described. FIG. 10 is a flowchart showing operations of the information processing device 100 in a case where the mode 3 is divided into two levels of the mode 3-1 and the mode 3-2. Here, it is assumed that the group 2 in FIG. 8 is applied in the mode 3-1, and the group 0 is applied in the mode 3-2.

Figure 10:
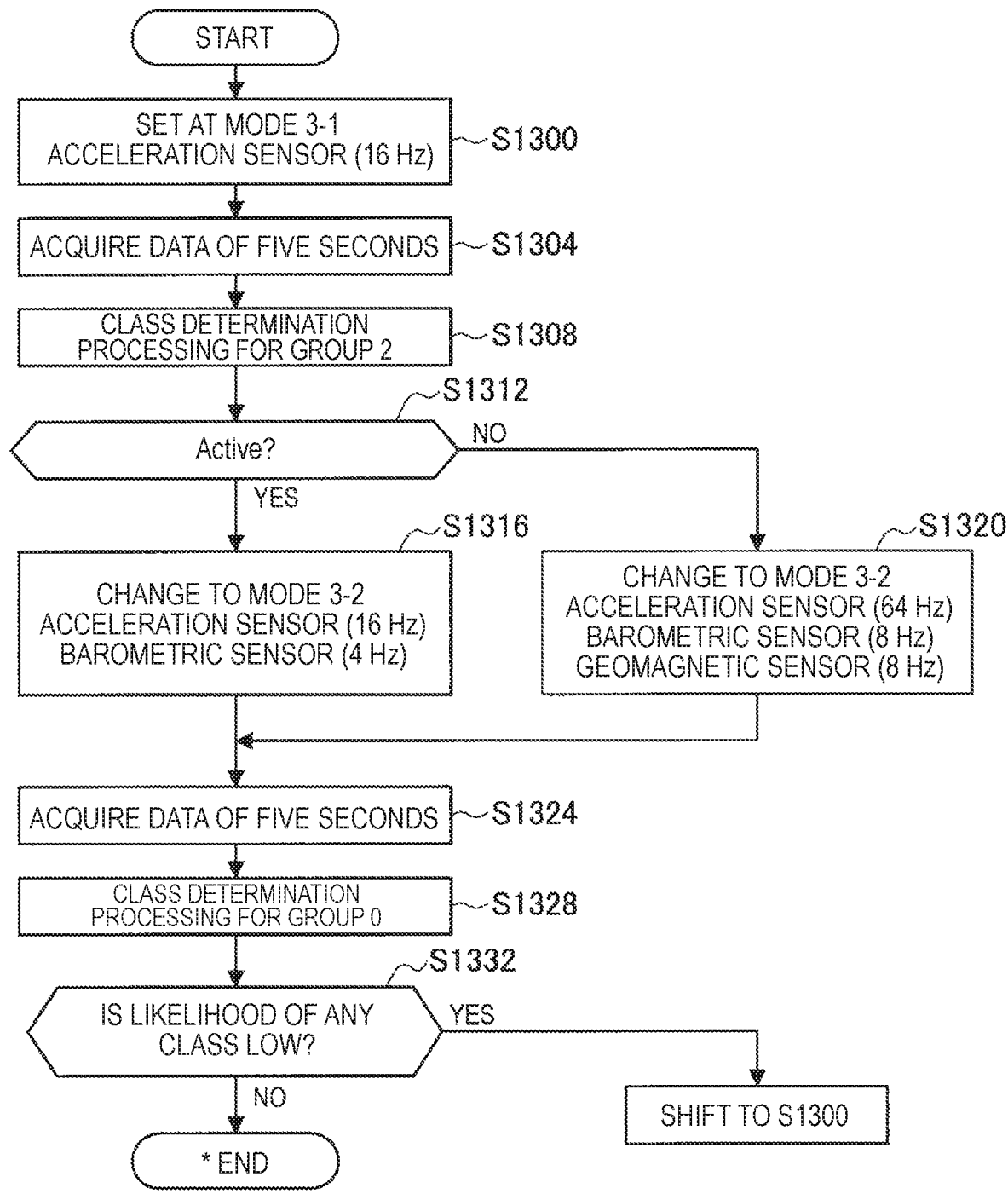
FIG. 10 is a flowchart showing an operation for class determination in the first variation.

In step S1300 of FIG. 10, the mode control unit 122 sets the mode at the mode 3-1 (the acceleration sensor: 16 Hz). In step S1304, the determination unit 123 acquires sensing data of five seconds from the acceleration sensor. In step S1308, the determination unit 123 performs class determination processing for the group 2. That is, the determination unit 123 performs determination about either "Active/Passive" using the sensing data.

In a case where it is determined that the class is Active (step S1312/Yes), the mode control unit 122 changes the mode to the mode 3-2 in step S1316 (the acceleration sensor: 16 Hz, the barometric sensor: 4 Hz). Here, that the class is Active refers to that the class is any of "Walk/Run/Upstairs/Downstairs" as shown in FIG. 8. In a case where it is determined that the class is Active, when sensing data is acquired from the barometric sensor besides the acceleration sensor, the determination unit 123 can determine upward and downward travelling directions. That is, the determination unit 123 can make determination about not only Walk and Run but also Upstairs and Downstairs. As a matter of course, a sensor other than the barometric sensor may be added.

In step S1312, in a case where it is determined that the class is not Active, that is, the class is Passive (step S1312/No), the mode control unit 122 changes the mode to the mode 3-2 (the acceleration sensor: 64 Hz, the barometric sensor: 8 Hz, the geomagnetic sensor: 8 Hz). Here, that the class is Passive refers to that the class is any of "Stay/EscUP/EscDown/ElevUP/ElevDown/Train/Bus/Car/Bicycle" as shown in FIG. 8. In a case where it is determined that the class is Passive, when sensing data is acquired from the barometric sensor and the geomagnetic sensor besides the acceleration sensor, the determination unit 123 can determine these motions or travelling means. As a matter of course, a sensor other than the barometric sensor and the geomagnetic sensor may be added.

In step S1324, the determination unit 123 acquires sensing data of five seconds from each sensor. In step S1328, the determination unit 123 performs class determination processing for the group 0. That is, the determination unit 123 performs the 13-class determination processing using the sensing data. In a case where the likelihood of any class is high in the 13-class determination processing performed by the determination unit 123 (step S1332/No), a result of the 13-class determination processing is output. Thereafter, the determination unit 123 continues data acquisition (step S1324) and the 13-class determination processing (step S1328) (in FIG. 10, processing corresponding to step S1332/No is illustrated as "END" for convenience). In step S1332, in a case where the likelihood of any class is low (step S1332/Yes), the process is shifted to step S1300, and the mode control unit 122 changes the mode from the mode 3-2 to the mode 3-1.

(5-2. Second Variation)

The first variation of the present disclosure has been described above. Subsequently, with reference to FIG. 11, a second variation of the present disclosure will be described. The second variation is a case in which a server performs determination processing instead of the determination unit 123. Here, with reference to FIG. 11, a configuration of the information processing system in the second variation will be described.

Figure 11:
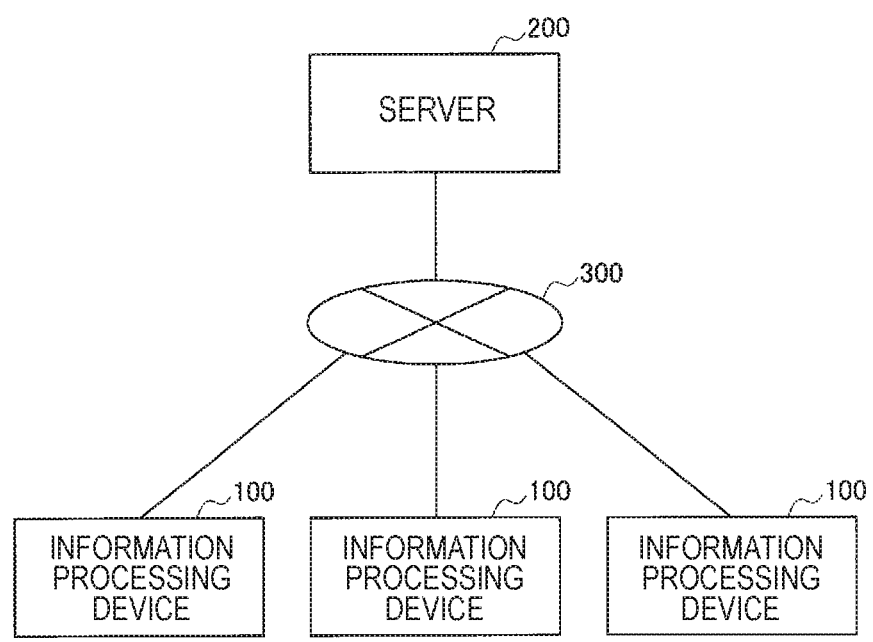
FIG. 11 is a diagram showing a configuration of an information processing system according to a second variation.

FIG. 11 is a diagram showing a configuration of the information processing system according to the second variation. As shown in FIG. 11, the information processing system according to the second variation includes the information processing device 100, a server 200, and a network 300. The server 200 is connected to one or more information processing devices 100 via the network 300, and the server 200 can have a function similar to that of the determination unit 123 of the information processing device 100. That is, the server 200 can perform determination processing for changing the mode or can perform class determination processing using sensing data provided from the information processing device 100.

Describing more specifically, in the second variation, the information processing device 100 transmits sensing data to the server 200, and the server 200 performs determination processing for changing the mode or class determination processing using the received sensing data, and transmits information concerning a result of the processing to the information processing device 100. The information processing device 100 having received the information performs changing of the mode, changing of a sensor to be used, changing of the sampling frequency, sensor control, or the like. Accordingly, the amount of power consumption of the information processing device or sensors may be reduced more.

In addition, the server 200 may perform part of determination processing instead of the determination unit 123. For example, in the mode 1, the determination unit 123 of the information processing device 100 may perform processing of calculating a norm, applying the BPF, and comparing the norm and a predetermined threshold value, and the server 200 may perform class determination processing in the mode 2 and the mode 3 instead of the determination unit 123. In this manner, processing contents of the information processing device 100 and the server 200 may be changed according to necessity. Accordingly, for example, in a case where processing performed by the server 200 is late, in a case where a failure occurs in the server 200, or the like, the information processing device 100 may perform determination processing.

Here, the server 200 may transmit information concerning a result of determination processing to another device other than the information processing device 100. For example, the server 200 may transmit the information to an information apparatus such as a robot provided at the user's house, office, or the like. Accordingly, the information apparatus can perform an operation or processing in accordance with a motion or travelling means of the user. For example, a robot provided at the user's house may determine that the user is on the way home by acquiring information that the user is riding in a train in a predetermined time slot (for example, a nighttime period or the like), and may perform processing of activating an air conditioner or the like. In addition, the server 200 may link information concerning a result of processing to a social networking service (SNS). This allows the user or others to grasp a motion or travelling means of the user, or the like on the SNS.

In addition, the server 200 may perform improvement of an algorithm for determination processing. Describing more specifically, the information processing device 100 provides the user with a function of making feedback to determination processing performed by the server 200 or the information processing device 100. The user feeds back that the determination processing is incorrect or correct using the information processing device 100. The information processing device 100 transmits information concerning the determination processing and feedback information to the server 200, and the server 200 performs improvement of an algorithm for determination processing using these pieces of information.

For example, in a case where similar contents have been fed back from many users, the server 200 may improve an algorithm for determination processing for all the users. In addition, in a case where similar contents have been fed back frequently from a certain user, the server 200 may customize the algorithm for the certain user. In addition, the server 200 may improve the algorithm taking user attributes (age, sex, height, weight, existence of disability, and the like) into consideration as well. After improving the algorithm, the server 200 provides the information processing device 100 with a program for determination processing to which the algorithm has been applied. Accordingly, a defect of the algorithm can be resolved, and determination processing suitable for each user may be performed.

6. APPLICATION EXAMPLES

Variations of the present disclosure have been described above. Subsequently, application examples of the present disclosure will be described. The present disclosure may be applied to products, systems, or services in various fields. Describing more specifically, by classifying a motion of a user or an object step by step, it is possible to reduce the amount of power consumption of an information apparatus.
(6-1. Application to Monitoring System)

First, the present disclosure may be applied to a monitoring system. For example, a monitoring server in the monitoring system assumes a state in which a suspicious person does not exist in a monitoring area as the mode 1, a state in which a suspicious person has intruded into the monitoring area as the mode 2, and a state in which a suspicious person is continuously performing some activity as the mode 3. Then, the monitoring server changes a sensor to be used, sampling frequency, processor to be used, or the like in accordance with the mode similarly to the present embodiment, and changes a sensor to be used in accordance with a determination result of the motion of the suspicious person. For example, in a case where it is determined that the suspicious person has put down a suspicious object and left when the mode 3 is set, the monitoring server may grasp features of the suspicious object by increasing sensors to be used. When the present disclosure is applied to the monitoring system, the monitoring server can reduce the amount of power consumption of the monitoring server or sensors as compared with a case in which a sensor to be used, sampling frequency, or processor to be used is not changed.
(6-2. Application to Vending Machine)

In addition, the present disclosure may be applied to a vending machine. For example, a vending machine assumes a state in which a user does not exist around the vending machine as the mode 1, a state in which the user exists around the vending machine as the mode 2, and a state in which the user is selecting a product of the vending machine as the mode 3. Then, the vending machine changes a sensor to be used, sampling frequency, processor to be used, or the like in accordance with the mode similarly to the foregoing, and changes a sensor to be used in accordance with a determination result of a motion of the user. For example, in a case where the mode 3 is set, the vending machine may determine user attributes (sex, age, and the like) by increasing sensors to be used, and may perform recommendation of a product on the basis of the determination result. When the present disclosure is applied to the vending machine, the vending machine can reduce the amount of power consumption of the vending machine or sensors as compared with a case in which a sensor to be used, sampling frequency, or processor to be used is not changed.

7. HARDWARE CONFIGURATION

An embodiment of the present disclosure has been described above. Information processing such as the above-described class determination processing is achieved by cooperation between software and hardware of the information processing device 100 which will be described below.

Figure 12:
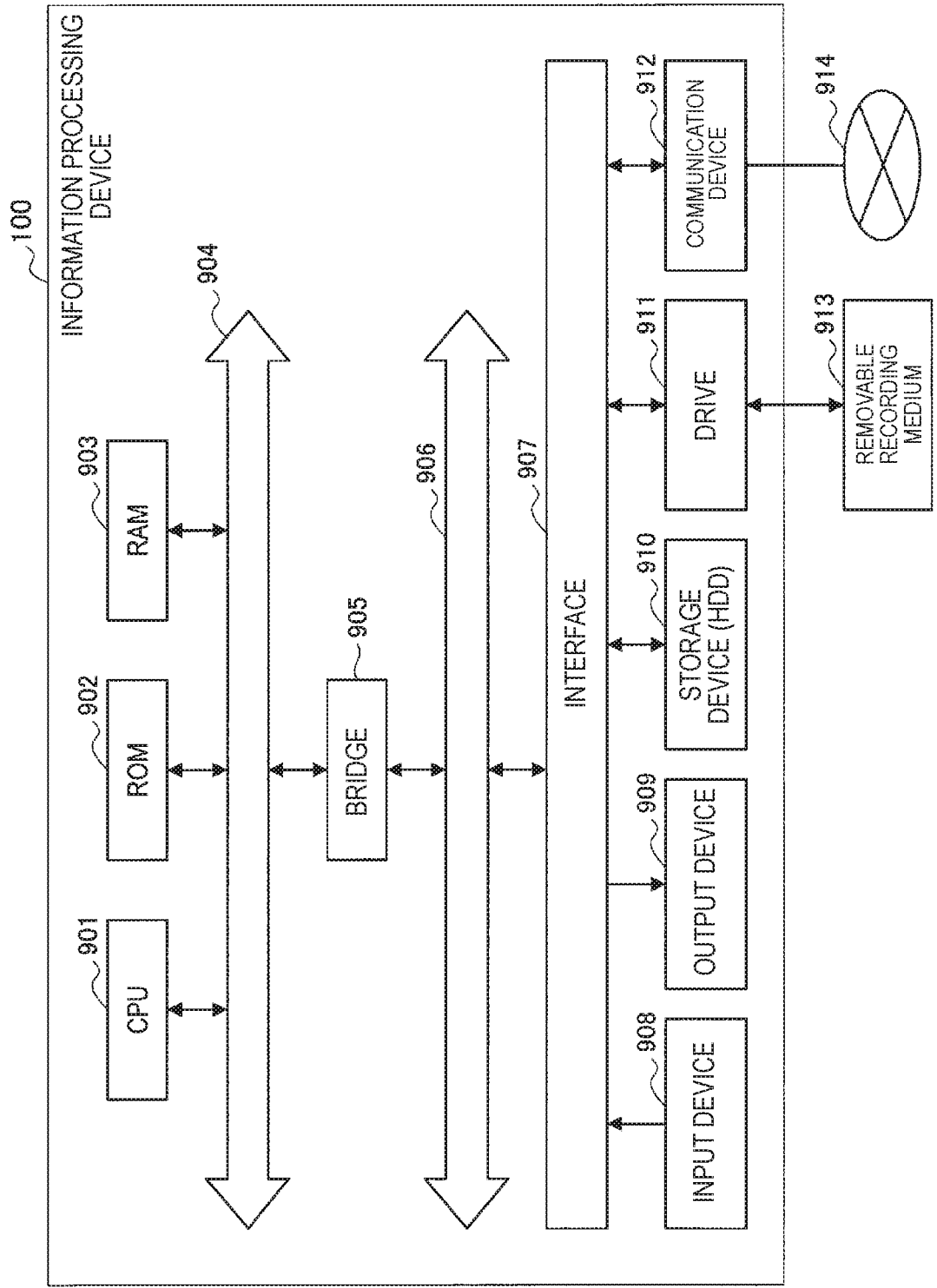
FIG. 12 is a diagram showing a hardware configuration of the information processing device according to the present embodiment.

FIG. 12 is a diagram showing a hardware configuration of the information processing device 100 according to the present embodiment. The information processing device 100 includes a central processing unit (CPU) 901, a read only memory (ROM) 902, a random access memory (RAM) 903, and a host bus 904. In addition, the information processing device 100 includes a bridge 905, an external bus 906, an interface 907, an input device 908, an output device 909, a storage device (HDD) 910, a drive 911, and a communication device 912.

The CPU 901 functions as an arithmetic processing device and a control device, and controls the overall operation in the information processing device 100 in accordance with various programs. In addition, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. These components are interconnected via the host bus 904 formed by a CPU bus or the like. Each function of the control unit 120 is achieved by cooperation of the CPU 901, the ROM 902, and the RAM 903.

The host bus 904 is connected to the external bus 906 such as a peripheral component interconnect/interface (PCI) bus through the bridge 905. Note that the host bus 904, the bridge 905, and the external bus 906 are not necessarily configured as separate components, and their functions may be incorporated into a single bus.

The input device 908 includes input means for the user to input information, such as a mouse, a keyboard, a touch panel, a button, a microphone, a switch, and a lever, an input control circuit that generates an input signal on the basis of the input by the user and outputs it to the CPU 901, and the like. The user of the information processing device 100 can input various types of data and instruct processing operations to the information processing device 100 by manipulating the input device 908.

The output device 909 includes, for example, a display device such as a cathode ray tube (CRT) display device, a liquid crystal display (LCD) device, an organic light emitting diode (OLED) device, and a lamp. Further, the output device 909 includes a sound output device such as a speaker and a headphone. The output device 909 outputs, for example, reproduced contents. Specifically, the display device displays various types of information such as reproduced video data by text or images. On the other hand, the sound output device converts reproduced sound data or the like into sound and outputs it.

The storage device 910 is a device for storing data configured as an example of the storage unit 170 of the information processing device 100 according to the present embodiment. The storage device 910 may include a recording medium, a recording device that records data in the recording medium, a readout device that reads out data from the recording medium, a deletion device that deletes data recorded in the recording medium, and the like. This storage device 910 includes, for example, a hard disk drive (HDD). This storage device 910 drives a hard disk, and stores a program executed by the CPU 901 and various types of data.

The drive 911 is a reader-writer for a recording medium, and is built in or externally attached to the information processing device 100. The drive 911 reads out information recorded in a removable recording medium 913 such as a magnetic disk, an optical disk, a magneto-optical disk, or a semiconductor memory being mounted, and outputs the information to the RAM 903. In addition, the drive 911 can also write information into the removable recording medium 913.

The communication device 912 is, for example, a communication interface including a communication device or the like for connection to a communication network 914. The function of the wireless communication unit 110 is achieved by the communication device 912.

Note that a hardware configuration of the information processing device 100 has been described above with reference to FIG. 12, whilst it is possible to configure hardware of the server 200 in the second variation in a substantially identical manner to the information processing device 100, and thus, description of a hardware configuration of the server 200 is omitted.

8. SUPPLEMENTAL NOTES

A hardware configuration of the information processing device 100 according to the present embodiment has been described above. Subsequently, with reference to FIG. 13 and FIG. 14, supplemental notes will be described.

(8-1. Setting Concerning Sensor Control)

First, with reference to FIG. 13, a setting function concerning sensor control will be described. As described above, the information processing device 100 can control each sensor on the basis of a result of class determination processing. Here, the information processing device 100 may provide the user with a screen for setting concerning the sensor control.

Figure 13:
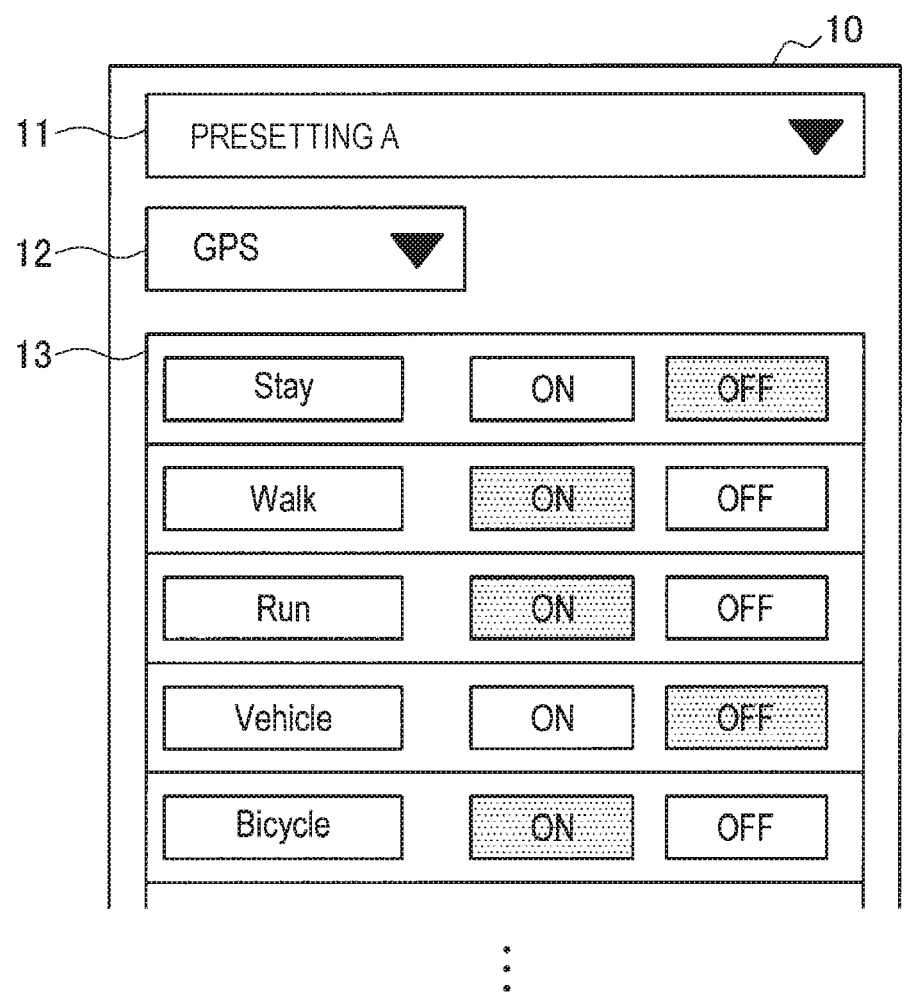
FIG. 13 is a diagram showing an example of a setting screen for sensor control based on a result of class determination processing.

FIG. 13 is a diagram showing an example of a setting screen for sensor control based on a result of class determination processing. A pull-down 11, a pull-down 12, and a switch button 13 are displayed on a screen 10 shown in FIG. 13. The pull-down 11 is information for identifying the setting of sensor control. For example, the pull-down 11 allows the user to select a presetting A, a presetting B, a presetting C, or the like, and to utilize the presetting A as the setting during commutation, the presetting B as the setting during work, and the presetting C as the setting for weekends. That is, the user can perform the setting of sensor control for each use.

In addition, the pull-down 12 is information for designating a sensor for which setting is to be performed. For example, the user selects a GPS sensor, a pedometer (or a sensor that senses an action of walking or an action of running), a sound recognition microphone (sound sensor), a heart-beat sensor, or the like with the pull-down 12 to designate a sensor for which setting is to be performed. In addition, the pull-down 12 may allow the user to designate something other than a sensor. For example, the pull-down 12 may allow the user to designate display (the display unit 150), notification (such as vibration), or the like.

In addition, the switch button 13 is a button for switching between activation and stop of the sensor or the like designated by the pull-down 12 in each class. For example, as shown in FIG. 13, in a case where the user has set at "Stay:OFF", the GPS sensor is stopped when it is determined that the user is not travelling (Stay). In addition, in a case where the user has set at "Wail:ON", the GPS sensor is activated when it is determined that the user is walking. In this manner, the user can select a use, sensor, and class using the screen to perform setting concerning sensor control.

(8-2. Setting Concerning Sensor Control)

Figure 14:
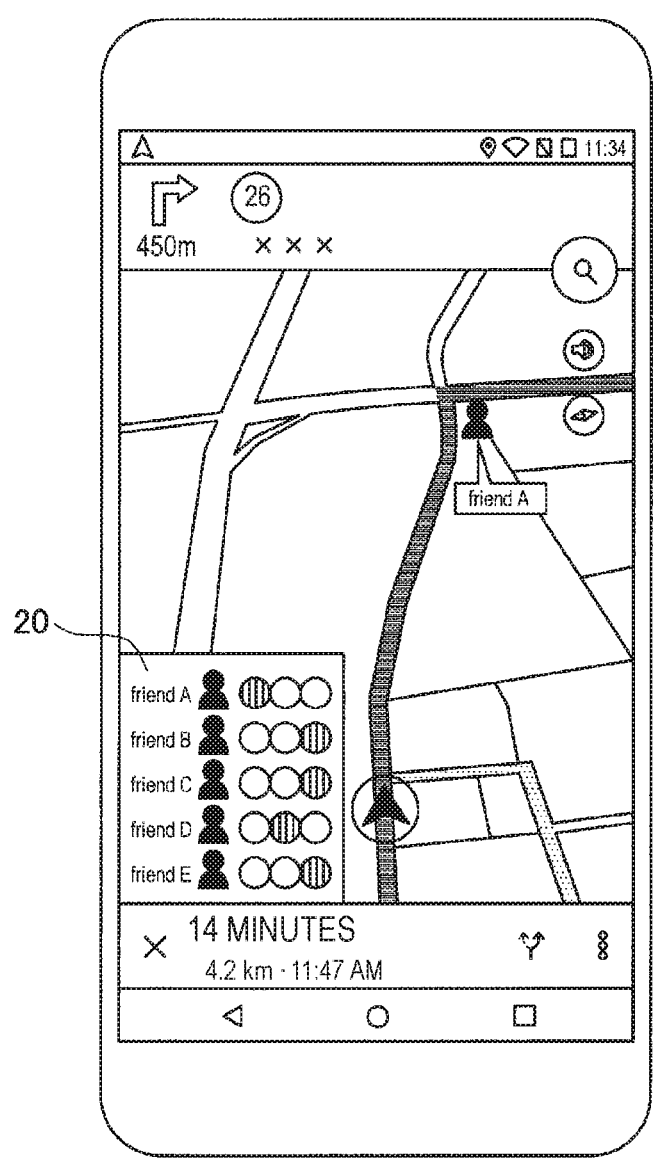
FIG. 14 is a diagram showing an example of a screen displayed by a display unit according to the present embodiment.

Subsequently, with reference to FIG. 14, a screen display function for a determination result will be described. FIG. 14 is a diagram showing an example of a screen displayed by the display unit 150 according to the present embodiment. A screen in a case where a route guidance application has been activated is shown in FIG. 14, and information concerning a determination result is shown in a region 20 on the screen.

Describing more specifically, the display unit 150 can display mode information corresponding to each user. For example, it is assumed that the lamp on the left side among three lamps displayed in the region 20 corresponds to the mode 1, the middle lamp corresponds to the mode 2, and the lamp on the right side corresponds to the mode 3. Accordingly, the user can grasp that a friend A in FIG. 14 is in a state of the mode 1, a friend D is in a state of the mode 2, and a friend B, a friend C, and a friend E are in a state of the mode 3. The user can estimate an action being performed by each user, an environment in which each user is located, or the like by grasping mode information corresponding to each user. For example, in a case where a mode corresponding to a certain user is the mode 3, it is estimated that the user is travelling. In addition, in a case where a mode corresponding to a certain user moves back and forth between the mode 1 and the mode 2, it is estimated that the user is at home, office, or the like.

In addition, although not shown, the display unit 150 may display mode information corresponding to the user himself/herself. Accordingly, in a case where the application is tied to mode information of the user, for example, the user can predict an operation of the application, or the like. Describing more specifically, in a case where an operation of the application varies from mode to mode, the user can predict an operation of the application by grasping a mode transition status, and thus can use the application more smoothly.

In addition, although not shown, the display unit 150 may display not only mode information, but also class information (Walk, Run, Train, or the like). Accordingly, the user can grasp a motion or travelling means of each user including the user himself/herself in more detail.

9. CONCLUSION

As described above, the information processing device 100 according to one embodiment of the present disclosure changes the mode step by step on the basis of a determination result of a motion of a person or the like, and changes a sensor to be used, sampling frequency, and processor to be used in accordance with the mode. In addition, the information processing device 100 changes a sensor to be used in accordance with a determination result of a motion of the user or the like. Accordingly, the information processing device 100 according to the present embodiment can reduce the amount of power consumption of the information processing device 100 or sensors.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is not always necessary to process the respective steps in the operation of the information processing device 100 according to the present embodiment in time series in the order illustrated as the flowcharts. For example, the respective steps illustrated in FIG. 6, FIG. 7, FIG. 9, or FIG. 10 may be processed in an order different from the order illustrated in the drawing, or may be processed in parallel, according to necessity. For example, step S1104 and step S1116 illustrated in FIG. 7 may be processed in a different order, or may be processed in parallel.

In addition, part of the configuration of the information processing device 100 may be provided outside the information processing device 100 according to necessity. For example, the information processing device 100 may perform various types of processing only using sensors included in an external device, without including the sensor unit 130.

In addition, some of the functions of the information processing device 100 may be embodied by the control unit 120. That is, the control unit 120 may embody some of the functions of the wireless communication unit 110, the sensor unit 130, the display control unit 140, the display unit 150, or the input unit 160.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
an acquisition unit configured to acquire sensing data; and
a mode changing unit configured to change a mode on a basis of the sensing data, in which
the acquisition unit changes sensing data to be acquired on a basis of a change of the mode.

(2)
The information processing device according to (1), in which
the mode changing unit changes the mode step by step on a basis of the sensing data.

(3)
The information processing device according any one of (1) or (2), in which
the mode changing unit changes the mode on a basis of sensing data acquired from an acceleration sensor.

(4)
The information processing device according to any one of (1) to (3), in which
the mode is a mode concerning a state of a motion of a user or an object.

(5)
The information processing device according to (4), in which
the mode includes a first mode applied to the information processing device when the user or the object is close to a state of continuously making a stop and a second mode applied to the information processing device when the user or the object is close to a state of continuously moving.

(6)
The information processing device according to (5), in which the acquisition unit acquires a larger number of types of sensing data in a case where the second mode is applied as compared with a case where the first mode is applied.

(7)
The information processing device according to (5), in which
the acquisition unit acquires sensing data generated by a sensor that consumes a larger amount of power in a case where the second mode is applied as compared with a case where the first mode is applied.

(8)
The information processing device according to any one of (5) to (7), in which
the acquisition unit changes a sampling frequency of the sensing data on a basis of the mode.

(9)
The information processing device according to (8), in which
the acquisition unit increases the sampling frequency in a case where the second mode is applied as compared with a case where the first mode is applied.

(10)
The information processing device according to any one of (5) to (9), further including:
a processor control unit configured to control a processor to be used in processing of the information processing device on a basis of the mode.

(11)
The information processing device according to (10), in which
the processor control unit determines to use a processor having a higher processing capability in a case of the second mode as compared with a case of the first mode.

(12)
The information processing device according to any one of (1) to (11), further including:
a determination unit configured to determine a motion of a user or an object on a basis of the sensing data.

(13)
The information processing device according to (12), in which
the acquisition unit changes the sensing data to be acquired on a basis of a determination result of the motion.

(14)
An information processing method to be executed by a computer, the information processing method including:
acquiring sensing data;
changing a mode on a basis of the sensing data; and
changing sensing data to be acquired on a basis of a change of the mode.

(15)
A program for causing a computer to:
acquire sensing data;
change a mode on a basis of the sensing data; and change sensing data to be acquired on a basis of a change of the mode.

REFERENCE SIGNS LIST 100 information processing device
110 wireless communication unit
120 control unit
130 sensor unit
140 display control unit
150 display unit
160 input unit
170 storage unit 200 server
300 network

The invention claimed is:

1. An information processing device, comprising:
a first processor;
a second processor different from the first processor;
a third processor different from the first processor and the second processor; and
circuitry configured to:
acquire, in a first mode of the information processing device, first sensing data from a sensor, wherein the first mode corresponds to a stop state of one of a user or an object;
process, in the first mode, the acquired first sensing data by the first processor;
change from the first mode to a second mode of the information processing device based on the processed first sensing data, wherein the second mode corresponds to a moving and stopping state of the one of the user or the object;
change from the first processor to the second processor based on the change from the first mode to the second mode, wherein the first processor corresponds to the first mode and the second processor corresponds to the second mode;
acquire, in the second mode, second sensing data from the sensor based on the change from the first mode to the second mode, wherein the second sensing data is different from the first sensing data;
determine, by the second processor in the second mode, that the one of the user or the object is in the stop state for a first number of times based on the acquired second sensing data, wherein the first number of times is less than a first threshold number of times;
determine, by the second processor in the second mode, that the one of the user or the object is in a moving state for a second number of times based on the acquired second sensing data, wherein
the second number of times is more than a second threshold number of times, and
the determination that the one of the user or the object is in the moving state for the second number of times is based on the determination that the one of the user or the object is in the stop state for the first number of times which is less than the first threshold number of times;
change from the second mode to a third mode of the information processing device based on the determination that the one of the user or the object is in the moving state for the second number of times which is more than the second threshold number of times,
wherein the third mode corresponds to a continuously moving state of the one of the user or the object;
change from the second processor to the third processor based on the change from the second mode to the third mode and the change from the first processor to the second processor, wherein the third processor corresponds to the third mode;
acquire, in the third mode, third sensing data from the sensor based on the change from the second mode to the third mode, wherein the third sensing data is different from the first sensing data and the second sensing data;
process, in the third mode, the acquired third sensing data by the third processor; and
determine motion of the one of the user or the object motion based on the processed third sensing data.

2. The information processing device according to claim 1, wherein the circuitry is further configured to
change from the third mode to the second mode based on the determination of the motion of the one of the user or the object, and the change from the second mode to the third mode.

3. The information processing device according to claim 1, wherein the sensor corresponds to an acceleration sensor.

4. The information processing device according to claim 1, wherein a number of types of the acquired second sensing data is larger than a number of types of the acquired first sensing data.

5. The information processing device according to claim 1, wherein the sensor has a larger power consumption in the second mode than in the first mode.

6. The information processing device according to claim 1, wherein the circuitry is further configured to change a sampling frequency of the acquisition of the second sensing data based on the change from the first mode to the second mode.

7. The information processing device according to claim 6, wherein the sampling frequency of the acquisition of the second sensing data, in the second mode, is higher than a sampling frequency of the acquisition of the first sensing data in the first mode.

8. The information processing device according to claim 1, wherein the second processor has a higher power consumption than the first processor, and the third processor has a higher power consumption than the second processor.

9. The information processing device according to claim 1, wherein the circuitry is further configured to acquire the second sensing data, different from the acquired first sensing data and the acquired third sensing data, based on a determination result of the determination of the motion of the one of the user or the object.

10. An information processing method, comprising:
in an information processing device including a first processor, a second processor different from the first processor, a third processor different from the first processor and the second processor, and circuitry:
acquiring, by the circuitry, first sensing data from a sensor, wherein
the first sensing data is acquired in a first mode of the information processing device, and
the first mode corresponds to a stop state of one of a user or an object;
processing, by the first processor, the acquired first sensing data in the first mode;
changing, by the circuitry, from the first mode to a second mode of the information processing device based on the processed first sensing data, wherein the second mode corresponds to a moving and stopping state of the one of the user or the object;
changing, by the circuitry, from the first processor to the second processor based on the change from the first mode to the second mode, wherein the first processor corresponds to the first mode and the second processor corresponds to the second mode;
acquiring, by the circuitry, second sensing data from the sensor based on the change from the first mode to the second mode, wherein
the second sensing data is different from the first sensing data, and
the second sensing data is acquired in the second mode;
determining, by the second processor in the second mode, that the one of the user or the object is in the stop state for a first number of times based on the acquired second sensing data, wherein the first number of times is less than a first threshold number of times;

determining, by the second processor in the second mode, that the one of the user or the object is in a moving state for a second number of times, wherein the second number of times is more than a second threshold number of times, and the determination that the one of the user or the object is in the moving state for the second number of times is based on the determination that the one of the user or the object is in the stop state for the first number of times which is less than the first threshold number of times;

changing, by the circuitry, from the second mode to a third mode of the information processing device based on the determination that the one of the user or the object is in the moving state for the second number of times which is more than the second threshold number of times, wherein the third mode corresponds to a continuously moving state of the one of the user or the object;

changing, by the circuitry, from the second processor to the third processor based on the change from the second mode to the third mode and the change from the first processor to the second processor, wherein the third processor corresponds to the third mode;

acquiring, by the circuitry, third sensing data from the sensor based on the change from the second mode to the third mode, wherein the third sensing data is different from the first sensing data and the second sensing data;

processing, by the third processor, the acquired third sensing data in the third mode; and determining, by the circuitry, motion of one of the user or the object based on the processed third sensing data.

11. A non-transitory computer-readable medium having stored thereon, computer-executable instructions which when executed by a computer of an information processing device, cause the computer to execute operations, the operations comprising:

acquiring, in a first mode of the information processing device, first sensing data from a sensor, wherein the first mode corresponds to a stop state of one of a user or an object;

processing, in the first mode, the acquired first sensing data by a first processor of the information processing device;

changing from the first mode to a second mode of the information processing device based on the processed first sensing data, wherein the second mode corresponds to a moving and stopping state of the one of the user or the object;

changing from the first processor to a second processor, of the information processing device, based on the change from the first mode to the second mode, wherein the first processor corresponds to the first mode and the second processor corresponds to the second mode, and the second processor is different from the first processor;

acquiring, in the second mode, second sensing data from the sensor based on the change from the first mode to the second mode, wherein the second sensing data is different from the first sensing data;

determining, by the second processor in the second mode, that the one of the user or the object is in the stop state for a first number of times based on the acquired second sensing data, wherein the first number of times is less than a first threshold number of times;

determining, by the second processor in the second mode, that the one of the user or the object is in a moving state for a second number of times based on the acquired second sensing data, wherein the second number of times is more than a second threshold number of times, and the determination that the one of the user or the object is in the moving state for the second number of times is based on the determination that the one of the user or the object is in the stop state for the first number of times which is less than the first threshold number of times;

changing from the second mode to a third mode of the information processing device based on the determination that the one of the user or the object is in the moving state for the second number of times which is more than the second threshold number of times, wherein the third mode corresponds to a continuously moving state of the one of the user or the object;

changing from the second processor to a third processor, of the information processing device, based on the change from the second mode to the third mode and the change from the first processor to the second processor, wherein the third processor corresponds to the third mode, and the third processor is different from the first processor and the second processor;

acquiring, in the third mode, third sensing data from the sensor based on the change from the second mode to the third mode, wherein the third sensing data is different from the first sensing data and the second sensing data;

processing, in the third mode, the acquired third sensing data by the third processor; and determining motion of the one of the user or the object based on the processed third sensing data.

* * * * *